United States Patent
Shinohara et al.

(10) Patent No.: US 12,162,186 B2
(45) Date of Patent: Dec. 10, 2024

(54) METHOD FOR PRODUCING FIBER-REINFORCED PLASTIC SUBSTRATE, AND FIBER-REINFORCED PLASTIC SUBSTRATE AND INTEGRATED MOLDING THEREOF

(71) Applicant: Toray Industries, Inc., Tokyo (JP)

(72) Inventors: Kotaro Shinohara, Ehime (JP); Yoshiki Takebe, Ehime (JP); Yoshihumi Nakayama, Ehime (JP); Masato Honma, Ehime (JP)

(73) Assignee: Toray Industries, Inc., Tokyo (JP)

( * ) Notice: Subject to any disclaimer, the term of this patent is extended or adjusted under 35 U.S.C. 154(b) by 347 days.

(21) Appl. No.: 17/607,106

(22) PCT Filed: May 15, 2020

(86) PCT No.: PCT/JP2020/019471
§ 371 (c)(1),
(2) Date: Oct. 28, 2021

(87) PCT Pub. No.: WO2020/235488
PCT Pub. Date: Nov. 26, 2020

(65) Prior Publication Data
US 2022/0227024 A1 Jul. 21, 2022

(30) Foreign Application Priority Data
May 23, 2019 (JP) .................. 2019-097035
May 23, 2019 (JP) .................. 2019-097036

(51) Int. Cl.
| | | |
|---|---|---|
| *B29B 15/12* | (2006.01) | |
| *C08J 5/04* | (2006.01) | |
| *B29K 101/10* | (2006.01) | |
| *B29K 101/12* | (2006.01) | |
| *B29K 105/08* | (2006.01) | |

(52) U.S. Cl.
CPC .............. *B29B 15/12* (2013.01); *C08J 5/042* (2013.01); *C08J 5/043* (2013.01); *B29K 2101/10* (2013.01); *B29K 2101/12* (2013.01); *B29K 2105/0881* (2013.01); *C08J 2377/02* (2013.01)

(58) Field of Classification Search
CPC ........ C08J 5/042; C08J 5/043; C08J 2377/02; C08J 2300/22; C08J 2400/22; C08J 2400/24; B29B 15/12; B29K 2101/10; B29K 2101/12; B29K 2105/0881; B29C 70/34; B29C 70/54
USPC ...................................................... 264/136
See application file for complete search history.

(56) References Cited

U.S. PATENT DOCUMENTS

| | | | |
|---|---|---|---|
| 11,926,111 B2 * | 3/2024 | Fujita | .............. C08J 5/243 |
| 2006/0110599 A1 | 5/2006 | Honma et al. | |
| 2011/0143110 A1 | 6/2011 | Tsuchiya et al. | |
| 2014/0154472 A1 | 6/2014 | Eto et al. | |
| 2015/0376353 A1 | 12/2015 | Takebe et al. | |
| 2016/0144595 A1 | 5/2016 | Wilenski et al. | |

FOREIGN PATENT DOCUMENTS

| | | |
|---|---|---|
| CN | 101085865 A | 12/2007 |
| CN | 103524769 A | 1/2014 |
| EP | 4082738 A1 | 11/2022 |
| JP | H02217231 A | 8/1990 |
| JP | H06041332 A | 2/1994 |
| JP | 08259713 A | 10/1996 |
| JP | 2004269878 A | 9/2004 |

(Continued)

OTHER PUBLICATIONS

Chinese Office Action for Chinese Application No. 202080032386.8, dated Jun. 1, 2023 with translation, 15 pages.
Chinese Office Action for Application No. 202080032386.8, dated Aug. 31, 2023 with translation, 19 pages.
International Search Report and Written Opinion for International Application No. PCT/JP2020/019471, dated Aug. 11, 2020, 6 pages.
Chinese Office Action for Chinese Application No. 202080032386.8, dated Dec. 30, 2022 with translation, 13 pages.

(Continued)

*Primary Examiner* — Hannah J Pak
(74) *Attorney, Agent, or Firm* — Buchanan Ingersoll & Rooney PC

(57) ABSTRACT

A method is described for producing a fiber-reinforced plastic substrate that simultaneously satisfies three points of joinability, mechanical characteristics, and productivity, the method including the following components [A], [B], and [C], wherein at least the following drawing step, first impregnating step, second impregnating step, and take-up step are continuously and sequentially performed while the component [A] is caused to run:
[A] a reinforcing fiber
[B] a thermoplastic resin
[C] a thermosetting resin
<drawing step> step of drawing a continuous reinforcing fiber sheet containing the component [A];
<first impregnating step> step of impregnating either the component [B] or the component [C] from one surface of the continuous reinforcing fiber sheet to obtain a fiber-reinforced plastic intermediate in which either the component [B] or the component [C] is disposed on a first surface;
<second impregnating step> step of impregnating the other of the component [B] or the component [C] from a second surface opposite to the first surface to obtain a fiber-reinforced plastic substrate; and
<take-up step> step of taking up the fiber-reinforced plastic substrate.

11 Claims, 7 Drawing Sheets

(56) References Cited

FOREIGN PATENT DOCUMENTS

| | | |
|---|---|---|
| JP | 2006044261 A | 2/2006 |
| JP | 2007291283 A | 11/2007 |
| JP | 2013209626 A | 10/2013 |
| JP | 2014069391 A | 4/2014 |
| JP | 2016097676 A | 5/2016 |
| WO | 2004060658 A1 | 7/2004 |
| WO | 2013008720 A1 | 1/2013 |
| WO | 2013128841 A1 | 9/2013 |
| WO | 2014103658 A1 | 7/2014 |

OTHER PUBLICATIONS

Taiwanese Office Action with Search Report for Taiwanese Application No. 109116632, dated Apr. 24, 2023 with translation, 24 pages.

Extended European Search Report for Application No. 20810669.0, dated May 15, 2023, 12 pages.

Office Action (Notice of Reasons for Refusal) issued May 1, 2024, by the Japan Patent Office in corresponding Japanese Patent Application No. 2020-088830 and an English translation of the Office Action. (10 pages).

* cited by examiner

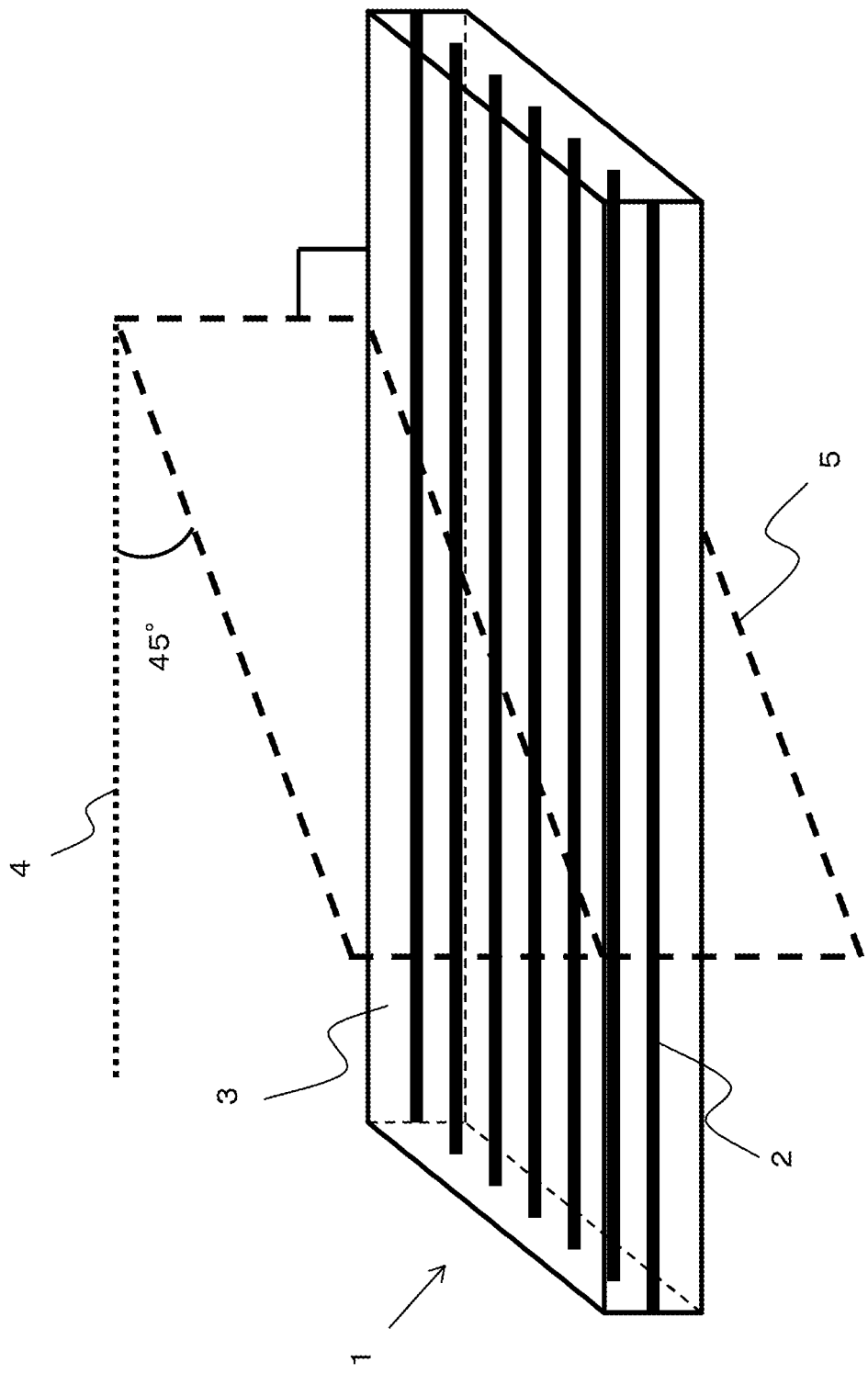
[Fig.1]

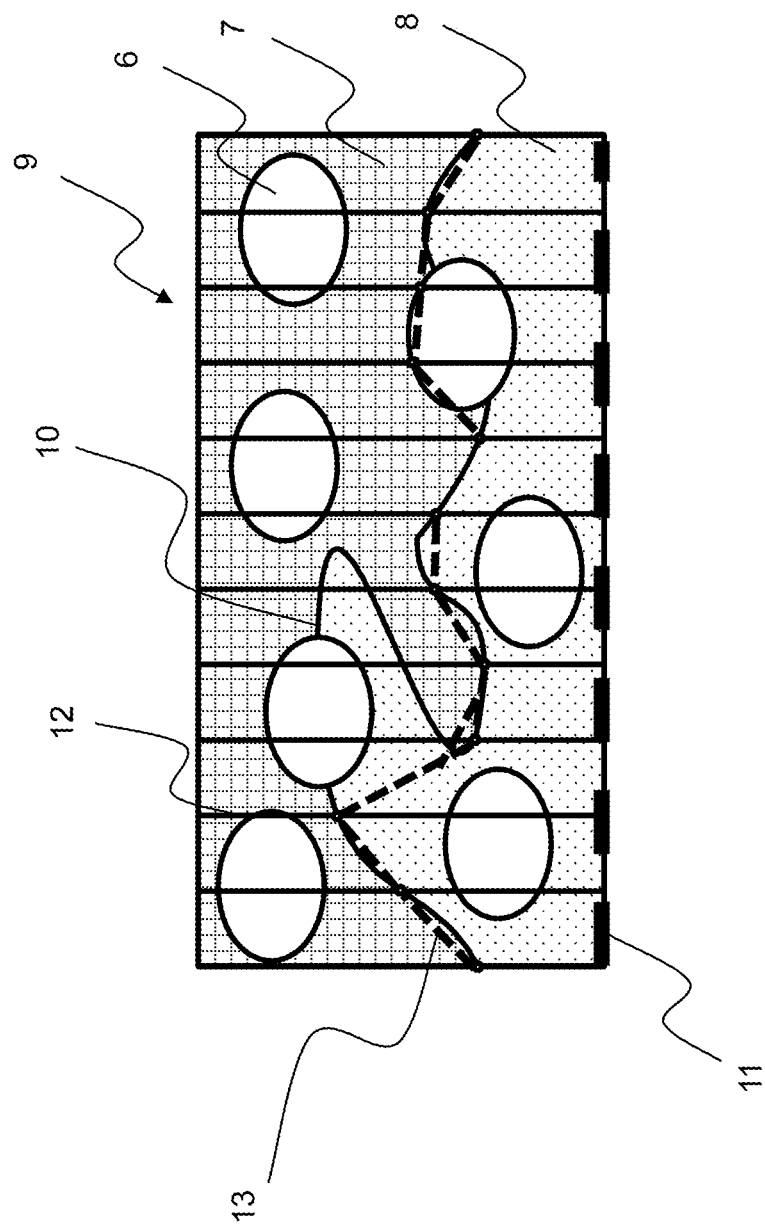
[Fig.2]

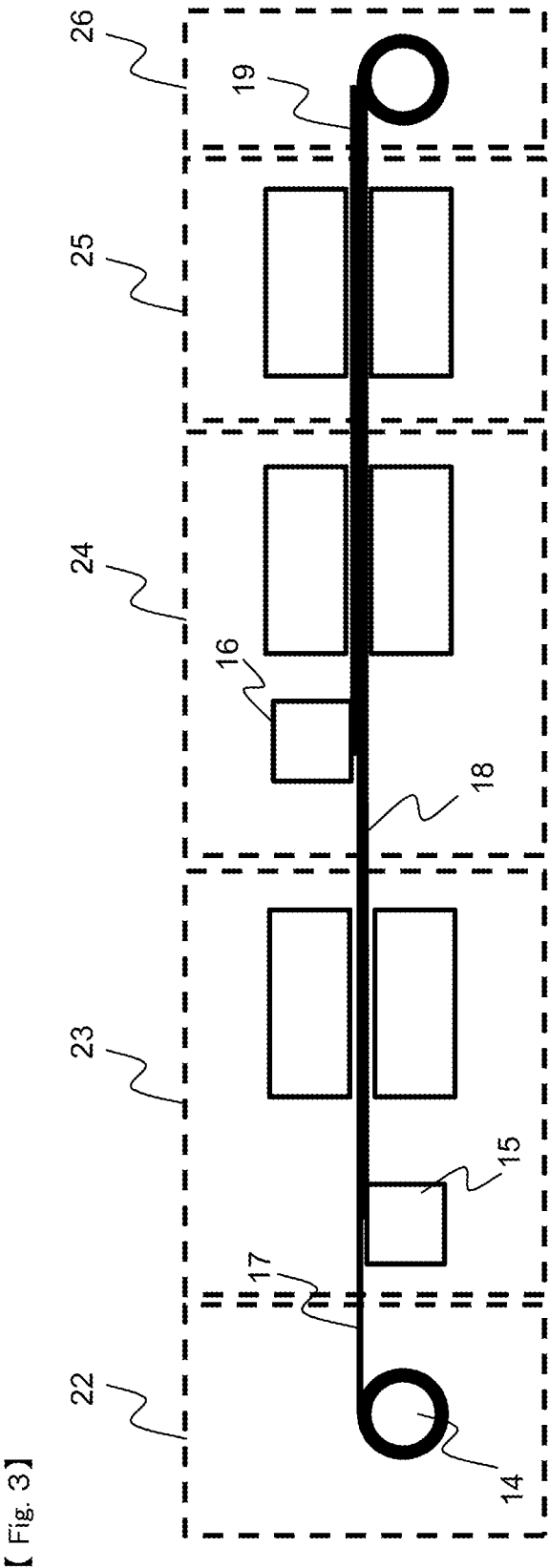
[Fig. 3]

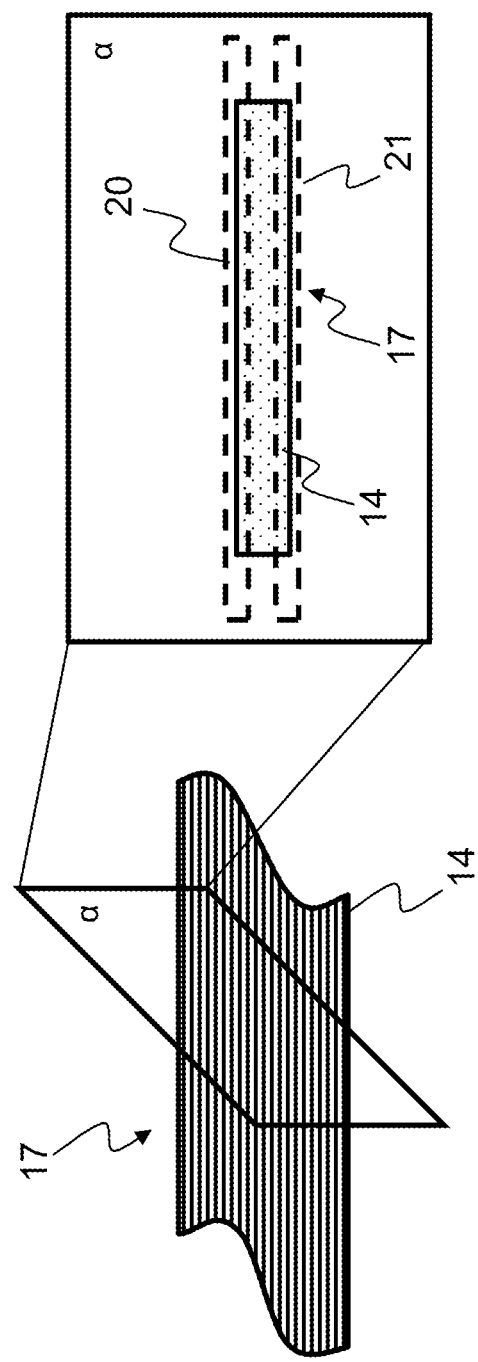
[Fig. 4]

[Fig. 5]
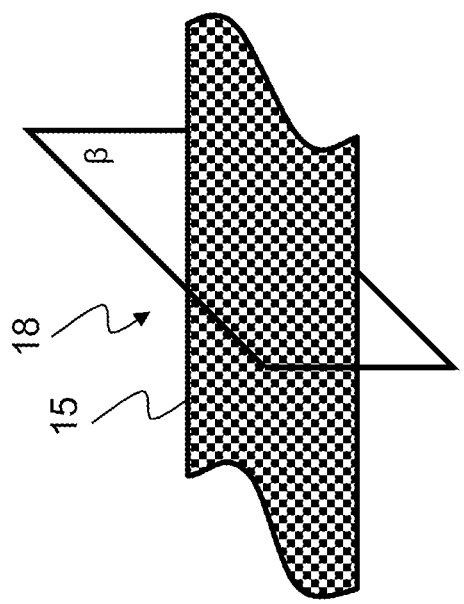
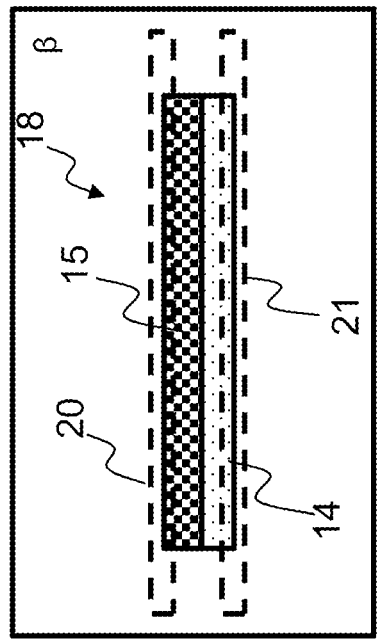

[Fig. 6]
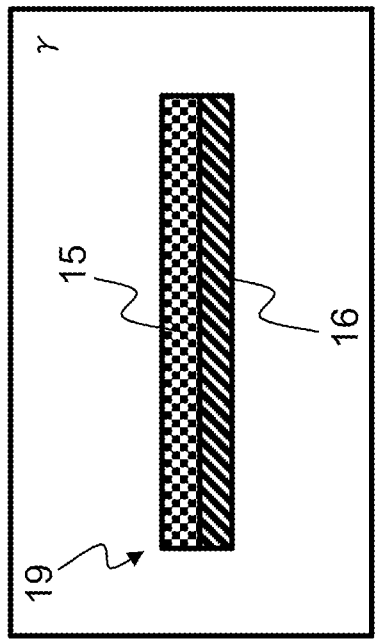
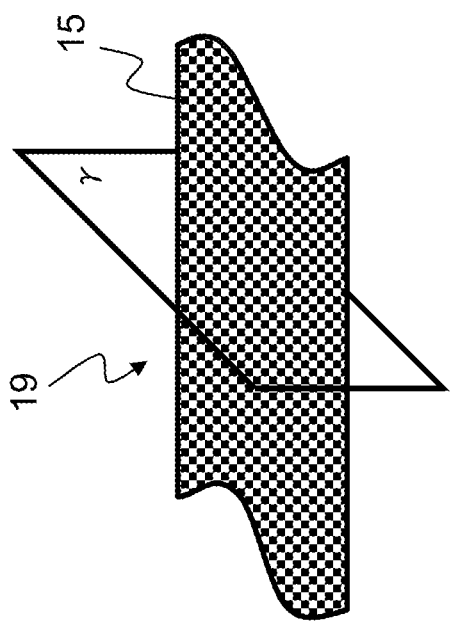

[Fig. 7]
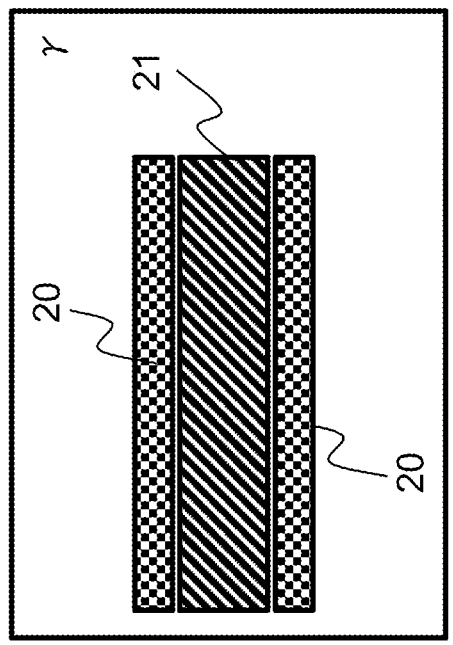
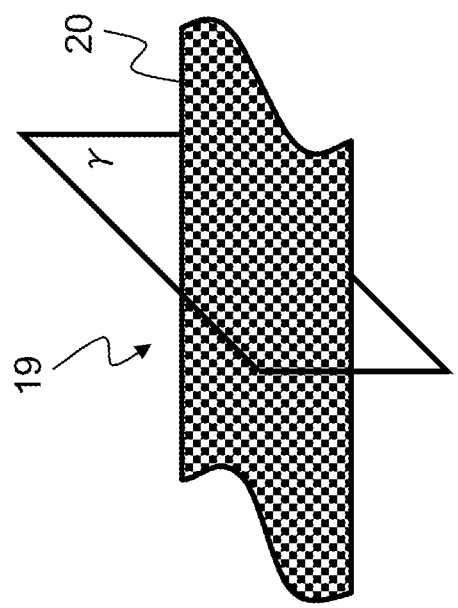

METHOD FOR PRODUCING FIBER-REINFORCED PLASTIC SUBSTRATE, AND FIBER-REINFORCED PLASTIC SUBSTRATE AND INTEGRATED MOLDING THEREOF

CROSS REFERENCE TO RELATED APPLICATIONS

This is the U.S. National Phase application of PCT/JP2020/019471, filed May 15, 2020, which claims priority to Japanese Patent Application No. 2019-097035, filed May 23, 2019 and Japanese Patent Application No. 2019-097036, filed May 23, 2019, the disclosures of these applications being incorporated herein by reference in their entireties for all purposes.

FIELD OF THE INVENTION

The present invention relates to a method for producing a fiber-reinforced plastic substrate containing reinforcing fibers, a thermoplastic resin, and a thermosetting resin, and to a fiber-reinforced plastic substrate as well as an integrated molding thereof.

BACKGROUND OF THE INVENTION

A fiber-reinforced resin obtained by using a thermosetting resin or a thermoplastic resin as a matrix resin and combining the resin with reinforcing fibers such as carbon fibers or glass fibers is excellent in mechanical characteristics such as strength and rigidity, heat resistance, and corrosion resistance while being lightweight. Therefore, the fiber-reinforced resin has been applied to many fields such as aerospace, automobiles, railway vehicles, ships, civil engineering and construction, and sports goods. However, the production process involves problems in generation of fiber fluff derived from the reinforcing fiber and improvement of process stability due to stickiness of the thermosetting resin. Furthermore, these fiber-reinforced resins are not suitable for producing a part or a structure having a complicated shape in a single molding step, and, in the above applications, it is necessary to prepare a member made of a fiber-reinforced resin and then integrate the member with another member.

A fiber-reinforced resin using a thermoplastic resin as a matrix resin can be integrated with other thermoplastic resin members by weld joining, and thus there is a possibility that the time required for joining between members can be shortened. On the other hand, when excellent mechanical characteristics at a high temperature and excellent resistance to chemicals are required as in an aircraft structural member, there is a problem that heat resistance and chemical resistance are not sufficient as compared with a fiber-reinforced resin composed of a thermosetting resin and a reinforcing fiber.

Here, Patent Document 1 describes a fiber-reinforced plastic substrate (prepreg) containing a thermoplastic resin and reinforcing fibers, and a method for producing the same. Patent Document 2 discloses a method for producing a laminate in which a thermoplastic resin layer is formed on a surface of a composite material (prepreg) composed of a thermosetting resin and reinforcing fibers, and describes that the laminate exhibits secondary weldability with other thermoplastic resin members via the thermoplastic resin. Patent Document 3 describes a discontinuous fiber-reinforced plastic substrate (sheet) in which one surface is impregnated with a thermoplastic resin and the other surface is impregnated with an adhesive resin. Patent Document 4 describes a fiber-reinforced plastic substrate (fiber-reinforced composite material) having secondary weldability, in which a thermoplastic resin is disposed on a surface of a reinforcing fiber substrate, and a thermosetting resin is injected and cured simultaneously or later.

Patent Document 5 discloses a technique of inserting a thermoplastic resin component between layers of a laminate obtained by laminating a fiber-reinforced plastic substrate (prepreg) using an epoxy resin composition as a matrix resin, for improving strength between the laminated layers. Patent Document 6 discloses a technique in which adhesive strength between a prepreg material and a mold release sheet and viscosity of a matrix resin are improved in order to suppress generation of fluff in a unidirectional carbon fiber prepreg material corresponding to a fiber-reinforced plastic substrate and to facilitate peeling of the prepreg material from the mold release sheet. Patent Document 7 discloses a method for improving fluffing derived from reinforcing fibers by improving a contact angle and a distance between an application device and the reinforcing fibers in a step of applying a matrix resin to a unidirectional reinforcing fiber sheet.

PATENT DOCUMENTS

Patent Document 1: International Publication No. 2013/8720
Patent Document 2: International Publication No. 2004/60658
Patent Document 3: International Publication No. 2014/103658
Patent Document 4: Japanese Patent Laid-open Publication No. 2006-44261
Patent Document 5: Japanese Patent Laid-open Publication No. 8-259713
Patent Document 6: Japanese Patent Laid-open Publication No. 2007-291283
Patent Document 7: Japanese Patent Laid-open Publication No. 2014-69391

SUMMARY OF THE INVENTION

However, in the fiber-reinforced plastic substrate and the method for producing the same presented in Patent Document 1, all the matrix resins are thermoplastic resins, and the reinforcing fibers are continuous and unidirectional. Therefore, in a step of weld joining the fiber-reinforced plastic substrate and another thermoplastic resin member described in Patent Document 1, the reinforcing fibers may be disturbed as the thermoplastic resin melts, and physical properties of the fiber-reinforced resin may be deteriorated. Therefore, it is necessary to adjust weld joining conditions.

Patent Document 2 discloses a fiber-reinforced composite material having continuous reinforcing fibers and a matrix resin composed of a thermosetting resin and a thermoplastic resin, and a method for producing the same. In this fiber-reinforced composite material, most of the reinforcing fibers are present in the thermosetting resin layer, the reinforcing fibers are less disturbed in the welding step, and the fiber-reinforced composite material can be integrated with another member via the thermoplastic resin, and exhibits excellent joining strength. However, in a case where the thermoplastic resin is a highly heat-resistant resin, when the thermoplastic resin is molten in a fiber-reinforced resin production process, there is a possibility that the thermosetting resin cannot withstand heat and may cause thermal decomposition and runaway reaction.

In the fiber-reinforced resin sheet described in Patent Document 3, both the thermoplastic resin layer and the adhesive layer have joinability, but the reinforcing fibers are discontinuous and nonwoven fabric-shaped, and thus the mechanical properties of the fiber-reinforced resin sheet itself do not necessarily satisfy the requirements of the industrial field.

The fiber-reinforced composite material described in Patent Document 4 has joinability to an arbitrary thermoplastic resin, but is a fiber-reinforced composite material for RTM molding, and can be molded only in a batch unit. Furthermore, a complicated step of preparing a reinforcing fiber substrate having a thermoplastic resin layer on one surface, disposing the reinforcing fiber substrate in a mold, and injecting a thermosetting resin is required, and productivity is not satisfied.

In Patent Document 5, mechanical characteristics are sufficiently improved by reinforcing the interlayers of the laminate with the thermoplastic resin, but the technique disclosed therein is to insert a thermoplastic resin when laminating prepregs. This patent document does not mention continuous production, and there is a concern about economic efficiency due to continuous production, and there is room for improvement.

In Patent Document 6, handleability in a molding step is improved by improving ease of peeling of the mold release sheet from the prepreg. However, the mold release sheet is removed and discarded in the molding step, and thus, in this respect, economic efficiency is deteriorated due to an increase in amount of waste, and further improvement is required.

Patent Document 7 discloses a contact relationship between a device for applying the matrix resin and the unidirectional reinforcing fiber sheet. However, the unidirectional reinforcing fiber sheet after application of the matrix resin affords room for further improvement in handleability during the subsequent take-up step and molding, due to stickiness derived from the matrix resin.

From the above, it has been urgently required to provide a fiber-reinforced plastic substrate which simultaneously satisfies handleability and productivity together with joinability and mechanical characteristics, or a method for producing the fiber-reinforced plastic substrate.

The present invention for solving the above problems mainly has one of the following configurations (1) and (2).

(1) A method for producing a fiber-reinforced plastic substrate containing the following components [A], [B], and [C], wherein at least the following drawing step, first impregnating step, second impregnating step, and take-up step are continuously and sequentially performed while the component [A] is caused to run:
[A] a reinforcing fiber
[B] a thermoplastic resin
[C] a thermosetting resin
  <drawing step> step of drawing a continuous reinforcing fiber sheet containing the component [A]
  <first impregnating step> step of impregnating either the component [B] or the component [C] from one surface of the continuous reinforcing fiber sheet to obtain a fiber-reinforced plastic intermediate in which either the component [B] or the component [C] is disposed on a first surface
  <second impregnating step> step of impregnating the other of the component [B] or the component [C] from a second surface opposite to the first surface to obtain a fiber-reinforced plastic substrate
  <take-up step> step of taking up the fiber-reinforced plastic substrate.

(2) A fiber-reinforced plastic substrate containing the following components [A], [B], and [C], wherein either the component [B] or the component [C] is impregnated into the component [A] from a side of a first surface which consists one surface, the other of the component [B] or the component [C] is impregnated into the component [A] from a side of a second surface opposite to the first surface, and a degree of cure of the component [C] obtained by DSC is 50% or less:
[A] a reinforcing fiber
[B] a thermoplastic resin
[C] a thermosetting resin.

According to the present invention, it is possible to provide a fiber-reinforced plastic substrate that simultaneously satisfies handleability and productivity as well as joinability and mechanical characteristics by continuously impregnating a thermoplastic resin and a thermosetting resin in any order into a drawn continuous reinforcing fiber sheet and taking it up.

BRIEF DESCRIPTION OF THE DRAWINGS

FIG. 1 is a schematic view of a fiber-reinforced plastic substrate according to the present invention.

FIG. 2 is a schematic view of an observed cross section of the fiber-reinforced plastic substrate according to the present invention.

FIG. 3 is a schematic view of an example of a method for producing the fiber-reinforced plastic substrate according to the present invention.

FIG. 4 is a schematic view of a continuous reinforcing fiber sheet according to the present invention.

FIG. 5 is a schematic view of a fiber-reinforced plastic intermediate according to the present invention.

FIG. 6 is a schematic view of the fiber-reinforced plastic substrate according to the present invention.

FIG. 7 is a schematic view of another example of the fiber-reinforced plastic substrate according to the present invention.

DETAILED DESCRIPTION OF EMBODIMENTS OF THE INVENTION

Hereinafter, the present invention will be described.
<Component [A]>

Examples of reinforcing fibers as component [A] used in the present invention include glass fibers, PAN-based, pitch-based, and rayon-based carbon fibers, metal fibers, aromatic polyamide fibers, polyaramid fibers, alumina fibers, silicon carbide fibers, boron fibers, and basalt fibers. These reinforcing fibers may be used alone, or two or more thereof may be used in combination as appropriate. These reinforcing fibers may be subjected to surface treatment. Examples of the surface treatment include a metal deposition treatment, a treatment with a coupling agent, a treatment with a sizing agent, and an additive attachment treatment. Among these reinforcing fibers, reinforcing fibers having conductivity are also included. As the reinforcing fibers, carbon fibers having low specific gravity, high strength, and high elastic modulus, particularly PAN-based carbon fibers are preferably used. Commercially available products of carbon fibers include "TORAYCA®" T800G-24K, "TORAYCA®" T800S-24K, "TORAYCA®" T700G-24K, "TORAYCA®" T700S-24K, "TORAYCA®" T300-3K, and "TORAYCA®" T1100G-24K (all manufactured by Toray industries, Inc.).

When a strand tensile strength of the reinforcing fibers as the component [A] is 5.5 GPa or more as measured in accordance with "Method for Testing Tensile Properties Using Carbon Fiber-Resin Impregnated Yarn Sample" described in JIS R7608 (2007), a laminate fiber-reinforced composite material having excellent joining strength in addition to the tensile strength is obtained, which is preferable. The strand tensile strength is more preferably 5.8 GPa. The joining strength referred to herein refers to tensile shear adhesive strength determined in accordance with ISO 4587 (1995).

<Component [B]>

The thermoplastic resin constituting component [B] is not particularly limited, and examples thereof include (i) polyester-based resins such as polyethylene terephthalate, polybutylene terephthalate, polytrimethylene terephthalate, polyethylene naphthalate and liquid crystal polyester, (ii) polyolefin-based resins such as polyethylene, polypropylene and polybutylene, (iii) styrene-based resins and urethane-based resins, (iv) polyamides such as polyoxymethylene, polyamide 6 and polyamide 66, (v) polycarbonate, (vi) polymethyl methacrylate, (vii) polyvinyl chloride, (ix) polyarylene sulfides such as polyphenylene sulfide, (x) polyphenylene ether, modified polyphenylene ether, (xi) polyimide, polyamideimide, polyetherimide, (xii) polysulfone, modified polysulfone, polyethersulfone, (xiii) polyarylene ether ketones such as polyketone, polyether ketone, polyetherether ketone and polyether ketone ketone, (ixx) polyarylate, (xx) polyether nitrile, (xxi) phenolic resins, and (xxii) phenoxy resins. In addition, these thermoplastic resins may be copolymers or modified products of the above-mentioned resins, and/or resins obtained by blending two or more thereof.

Especially, at least one thermoplastic resin selected from the group consisting of polyolefin, polycarbonate, polyester, polyarylene sulfide, polyamide, polyoxymethylene, polyetherimide, polyethersulfone, and polyarylene ether ketone is preferable from the viewpoint of the balance between molding processability, and heat resistance and mechanical characteristics. In addition, polyolefins and polyamides are preferable from the viewpoint of versatility. The polyolefin preferably contains a reactive functional group from the viewpoint of adhesiveness, and is preferably a polyolefin modified with at least one selected from a carboxyl group, an acid anhydride group, a hydroxyl group, an epoxy group, an amino group, and a carbodiimide group. A polyolefin modified with an acid anhydride group is particularly preferable. As the polyamide, a copolymer can be preferably used from the viewpoint of adhesiveness to the component [C] and other thermoplastic resins. Among the copolymers, a terpolymer polyamide is preferable. Examples of the polyamide copolymer include polyamide 12, polyamide 610, and polyamide 6/66/610. Particularly the terpolymer polyamide 6/66/610 is preferable from the viewpoint of adhesiveness to the main component [B]. A content of the component [B] is preferably 60 wt % or more, polypropylene is preferable from the viewpoint of economic efficiency, an amorphous resin such as polycarbonate or a styrene-based resin is preferable from the viewpoint of surface appearance, and a polyamide is preferable from the viewpoint of strength and productivity. In order to improve impact resistance, an elastomer or a rubber component may be added.

Furthermore, other fillers and additives may be appropriately contained depending on the application and the like, as long as the object of the present invention is not impaired. Examples of such other fillers and additives include inorganic fillers, flame retardants, conductivity imparting agents, crystal nucleating agents, ultraviolet absorbers, antioxidants, damping agents, antibacterial agents, insect repellents, deodorants, coloring inhibitors, heat stabilizers, mold release agents, antistatic agents, plasticizers, lubricants, coloring agents, pigments, dyes, foaming agents, antifoaming agents, and coupling agents.

<Component [C]>

Examples of a thermosetting resin composition to be used in component [C] include an unsaturated polyester resin, a vinyl ester resin, an epoxy resin, a phenol resin, a urea resin, a melamine resin, a polyimide resin, a cyanate ester resin, a bismaleimide resin, a benzoxazine resin, or a copolymer or modified product thereof, and a resin obtained by blending at least two thereof. In order to improve impact resistance, an elastomer or a rubber component may be added to the thermosetting resin. Especially, an epoxy resin is preferable because it is excellent in mechanical characteristics, heat resistance, and adhesiveness to reinforcing fibers. Examples of a main agent of the epoxy resin include bisphenol type epoxy resins such as bisphenol A type epoxy resins, bisphenol F type epoxy resins, bisphenol AD type epoxy resins, and bisphenol S type epoxy resins; brominated epoxy resins such as tetrabromobisphenol A diglycidyl ether; epoxy resins having a biphenyl skeleton; epoxy resins having a naphthalene skeleton; epoxy resins having a dicyclopentadiene skeleton; novolac type epoxy resins such as phenol novolac type epoxy resins and cresol novolac type epoxy resins; glycidyl amine type epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, N,N,N',N'-tetraglycidyl-m-xylylenediamine, N,N-diglycidylaniline, and N,N-diglycidyl-o-toluidine; resorcidyl glycidyl ether; and triglycidyl isocyanurate.

Examples of a curing agent for the epoxy resin include dicyandiamide, an aromatic amine compound, a phenol novolac resin, a cresol novolac resin, a polyphenol compound, an imidazole derivative, tetramethylguanidine, a thiourea-added amine, a carboxylic acid hydrazide, a carboxylic acid amide, and a polymercaptan.

<Fiber-Reinforced Plastic Substrate>

[Amount of Component [A]]

In the fiber-reinforced plastic substrate of the present invention, an amount of the reinforcing fibers per unit area is preferably 30 to 2,000 $g/m^2$. When the amount of the reinforcing fibers is 30 $g/m^2$ or more, a number of the fiber-reinforced plastic substrates laminated, for example, in order to obtain a predetermined thickness when molding a fiber-reinforced resin laminate can be reduced, and the operation tends to be simple. On the other hand, when the amount of the reinforcing fibers is 2,000 $g/m^2$ or less, drapability of the fiber-reinforced plastic substrate is easily improved. The amount of the reinforcing fibers is preferably 300 $g/m^2$ or less. Within such a range, the component [C] is easily impregnated in the second impregnating step which will be described later, and the production speed can be increased.

A mass content rate of the component [A] in the fiber-reinforced plastic substrate of the present invention is preferably 30 to 90 mass %, more preferably 35 to 85 mass %, and still more preferably 40 to 80 mass %. The range of the mass content rate may be a combination of any of the above upper limits and any of the lower limits. When the mass content rate of the component [A] is 30 mass % or more, the amount of the resin is not excessively large as compared with the amount of the fibers, the advantage of the laminate having excellent specific strength and specific elastic modulus is easily obtained, and a calorific value during curing is hardly excessively increased during molding of the laminate. When the mass content rate of the component [A] is 90 mass % or less, resin impregnation failure is unlikely to occur, and a number of voids in the resulting laminate is likely to be decreased.

[Basis Weight of Component [B]]

A basis weight of the component [B] in the fiber-reinforced plastic substrate of the present invention is preferably 10 g/m² or more. When the basis weight is 10 g/m² or more, a weld joining layer having a sufficient thickness is obtained in weld joining to another member which will be described later, and excellent joining strength is exhibited. The basis weight is more preferably 20 g/m². An upper limit value is not particularly limited, but is preferably 500 g/m² or less in order to obtain a fiber-reinforced plastic substrate in which an amount of the thermoplastic resin is not excessively large as compared with the amount of the reinforcing fibers and which is excellent in specific strength and specific elastic modulus. Here, the basis weight refers to a mass (g) of the component [B] contained per 1 m² of the fiber-reinforced plastic substrate.

In the present invention, the component [B] preferably covers the entire surface of one or both of a first surface and a second surface of the fiber-reinforced plastic substrate. By covering the entire surface, not only joinability can be imparted to the fiber-reinforced plastic substrate, but also the component [C] can be prevented from oozing out on the surface covered by the component [B]. The phrase "covering the entire surface" means that it is sufficient as long as substantially the entire surface is covered by the component [B] in a projection plane in a thickness direction of the fiber-reinforced plastic substrate, and, when the continuous reinforcing fiber sheet or the fiber-reinforced plastic intermediate is impregnated with the component [B], an area of a region where the component [B] is absent is set to be in a range of 0 to 20%, based on 100% of an area of the continuous reinforcing fiber sheet or the fiber-reinforced plastic intermediate when projected in a thickness direction thereof. The area where the component [B] is absent is more preferably in a range of 0 to 10% from the same viewpoint. The ratio can be determined by magnifying the continuous reinforcing fiber sheet or the fiber-reinforced plastic intermediate with a laser microscope at a magnification of 100 times, determining an area of the component [B] from an observed field of view, and obtaining a difference from the observed field of view.

[Amount of Component [A] in Component [C]]

In the fiber-reinforced plastic substrate of the present invention, a volume of the component [A] impregnated into the component [C] is preferably 50 to 99%, and more preferably 75 to 95% of a total volume of the component [A] contained in the fiber-reinforced plastic substrate. While the fiber-reinforced plastic substrate according to the present invention preferably has a layer of a resin area mainly composed of the component [B] and a layer of a resin area mainly composed of the component [C], the component [A] Impregnated into the component [C] means the component [A] present in the resin area mainly composed of the component [C]. Here, the phrase "mainly composed of" means that a resin component is contained in an amount of 50 mass % to 100 mass % based on 100 mass % of a constituent resin component. As a preferable range of the amount of the component [A] impregnated into the component [C], any value of the above upper limit may be set as an upper limit, and any value of the above lower limit may be set as a lower limit. Within such a range, when another member which will be described later and the fiber-reinforced plastic substrate are weld joined by melting the component [B], it is possible to suppress disturbance of the reinforcing fibers in the vicinity of a welding interface, and the fiber-reinforced plastic substrate of the present invention easily exhibits characteristics such as mechanical characteristics, thermal characteristics, and chemical resistance unique to the composite material containing the components [A] and [C].

Examples of a method for measuring the amount of the component [A] impregnated into the component [C] include a method in which segmentation analysis is performed using an X-ray CT image of a small piece of the fiber-reinforced plastic substrate of the present invention in which the component [C] is cured, and the volume of the component [A] present in the resin area mainly composed of the component [C] is divided by the total volume of the component [A] contained in the small piece to determine a ratio [%], and a method in which the ratio [%] is determined by dividing the area of the component [A] present in the resin area mainly composed of the component [C] by the area of the component [A] contained in the entire small piece, from a cross-section observation photograph of the small piece of the fiber-reinforced plastic substrate of the present invention in which the component [C] is cured, which is obtained by an optical microscope, a scanning electron microscope (SEM), or a transmission electron microscope (TEM). The fiber-reinforced plastic substrate used for the measurement may be dyed in order to adjust a contrast between the resin area mainly composed of the component [B] and the resin area mainly composed of the component [C] in the observation. Especially, from the viewpoint that the content can be precisely measured, the amount is preferably measured by segmentation analysis.

[Thickness Ratio]

In the fiber-reinforced plastic substrate of the present invention having the resin area mainly composed of the component [B] and the resin area mainly composed of the component [C], when a thickness of the finally obtained fiber-reinforced plastic substrate is 100%, it is preferable that a thickness ratio of the resin area mainly composed of the component [B] should be in a range of 2 to 54%, and that a thickness ratio of the resin area mainly composed of the component [C] should be in a range of 98 to 46%. When the thickness ratio of the resin area mainly composed of the component [B] is within the range of 2 to 54%, it is possible to prevent deterioration in drape of the fiber-reinforced plastic substrate due to the thickness of the resin area mainly composed of the component [B] disposed on the surface. Furthermore, since the thickness of the resin area mainly composed of the component [B] is within the range of the present invention, it is possible to prevent breakage, tear, and the like of the component [B] when impregnating the component [B]. Preferably, the thickness ratio is in a range of 5 to 30%. Examples of a method for measuring the thickness ratio include a method in which segmentation analysis is performed using an X-ray CT image of a small piece of the fiber-reinforced plastic substrate of the present invention in which the component [C] is cured, the volume of the resin area mainly composed of the component [B] and the volume of the resin area mainly composed of the component [C] are calculated, and the thickness ratio is calculated from a volume ratio, and a method in which the area of the resin area mainly composed of the component [B] and the area of the resin area mainly composed of the component [C] are obtained from a cross-section observation photograph of a small piece of the fiber-reinforced plastic substrate of the present invention in which the component [C] is cured, which is obtained by an optical microscope, a scanning electron microscope (SEM), or a transmission electron microscope (TEM), and the thickness ratio is calculated from an area ratio. Especially, from the viewpoint that the content can be precisely measured, the amount is preferably measured by segmentation analysis.

[Impregnation Rate]

In the fiber-reinforced plastic substrate of the present invention, an impregnation rate is preferably 80% or more. The impregnation rate is more preferably 85% or more, and still more preferably 90% or more. Here, the impregnation rate is determined not by directly measuring a ratio of the resin impregnated into the fiber-reinforced plastic substrate, but by measuring a site that is not impregnated with the resin by a specific method and determining the impregnation rate from a difference from a total cross-sectional area determined from an outer shape of the fiber-reinforced plastic substrate. The larger the impregnation rate, the smaller the number of voids contained in the fiber-reinforced plastic substrate, and a fiber-reinforced plastic substrate having both appearance and high mechanical characteristics can be obtained.

As a measurement method, in cross-section observation orthogonal to a longitudinal direction of the obtained fiber-reinforced plastic substrate, when the total cross-sectional area of the fiber-reinforced plastic substrate including voids in the fiber-reinforced plastic substrate is denoted by A0 and a cross-sectional area of the voids is denoted by A1, a value obtained by the following formula (1) is used.

$$\text{Impregnation rate} = (A0 - A1)/A0 \quad (1)$$

[Adhesive Strength]

In the fiber-reinforced plastic substrate of the present invention, adhesive strength between the resin area mainly composed of the component [B] and the resin area mainly composed of the component [C] is preferably 1 N/10 mm or more. According to such a configuration, when handling the obtained fiber-reinforced plastic substrate, it is possible to prevent the resin area mainly composed of the component [B] from being peeled off from the resin area mainly composed of the component [C]. The adhesive strength is more preferably 10 N/10 mm or more from the same viewpoint. An upper limit is not particularly limited, but is sufficiently 100 N/10 mm for practical use.

Such adhesive strength can be determined as follows. According to "10.4 Measurement of Peeling Adhesive Force" described in "Adhesive Tape/Adhesive Sheet Test Method" in JIS 20237 (2009), the fiber-reinforced plastic substrate is cut into a piece having a width of 10 mm and a length of 100 mm, and the cut piece is fixed to a flat plate made of an SUS material to prepare a test piece. For this test piece, the resin area mainly composed of the component [B] is peeled off at a speed of 1000 mm/min in a direction of 180 degrees, and a simple average value of loads at that time is defined as the adhesive strength.

[Roughness Average Length, Roughness Average Height]

In the fiber-reinforced plastic substrate of the present invention, the component [A] exists in both the resin area containing the component [B] and the resin area containing the component [C], across a boundary between the resin areas. In a cross section perpendicular to a plane of the fiber-reinforced plastic substrate containing the fibers as the component [A] present across both the resin areas, that is, a cross section obtained by cutting the fiber-reinforced plastic substrate perpendicular to a planar direction of the fiber-reinforced plastic substrate, from a direction at an angle different by 45 degrees from a direction of an arbitrary fiber as the component [A] contained in both the resin areas, whether clockwise or counterclockwise when the fiber-reinforced plastic substrate is viewed in plan view, a roughness average length RSm and a roughness average height Rc, as defined by JIS B0601 (2001), of a curve formed by the boundary between both the resins, are preferably 100 μm or less and 3.5 μm or more, respectively. The roughness average height Rc is more preferably 10 μm or more.

As to the component [A] being contained in both the resin areas across the boundary of the resin areas will be described with reference to FIG. 2. In an observation image 9 of FIG. 2, a resin area 7 containing the component [B] is in close contact with a resin area 8 containing the component [C], and a boundary 10 is illustrated in the observation image 9. In addition, a plurality of components [A] 6 exist on the boundary 10. A state in which the component [B] and the component [C] are in contact with the periphery of the reinforcing fibers as described above can be said to be a state in which the reinforcing fibers are "contained in both the resin areas across the boundary". The presence of the reinforcing fibers [A] improves the strength of the resin area containing the component [C] and improves the joining strength.

The presence of the reinforcing fibers contained in both the resin area containing the component [B] and the resin area containing the component [C] across the boundary between the resin areas improves the strength of the resin area containing the component [B] and improves the joining strength. When the component [A] is chemically or/and physically bonded to the component [B] and the component [C] across the boundary, adhesion force between the resin area containing the component [B] and the resin area containing the component [C] is improved. A number of the components [A] existing across the boundary may be 1 or more, and an upper limit number is not particularly limited, but is 200 in an observation range which will be described later.

The boundary between the resin area containing the component [B] and the resin area containing the component [C] is observed in a cross section perpendicular to the plane of the fiber-reinforced plastic substrate containing the component [A] existing across both the resin areas from a direction at an angle different by 45 degrees from a direction of an arbitrary fiber as the component [A] contained in both the resin areas, whether clockwise or counterclockwise, in a plan view of the fiber-reinforced plastic substrate. By observing an aspect of the resin areas at the boundary in such a cross section, it is possible to simultaneously evaluate the adhesion force in the fiber direction and the direction orthogonal thereto.

In such cross-section observation, when the roughness average length RSm as defined in JIS B0601 (2001) of a curve (hereinafter, referred to as a cross-section curve) formed by the boundary is 100 μm or less, not only a chemical or/and physical binding force but also a mechanical binding force (that is, an anchor effect) such as entanglement is applied, and the resin area containing the component [B] and the resin area containing the component [C] are less likely to be separated from each other. A lower limit value is not particularly limited, but is preferably 15 μm or more from the viewpoint of avoiding a decrease in mechanical binding force due to stress concentration. When the roughness average height Rc of the cross-section curve is 3.5 μm or more, not only the mechanical binding force due to interlacement but also the component [A] existing across the boundary is chemically or/and physically bonded to the component [B] and the component [C], so that the adhesion force between the resin area containing the component [B] and the resin area containing the component [C] is improved. A preferable range of the roughness average height Rc of the cross-section curve is 10 μm or more, particularly preferably 20 μm or more, in which the component [A] is easily contained in both the resin areas and the adhesion force is further improved. An upper limit value is not particularly limited, but is preferably 100 μm or less from the viewpoint of avoiding a decrease in mechanical binding force due to stress concentration.

Here, as a method for measuring the roughness average height Rc and the roughness average length RSm of the cross-section curve, a known method can be used. Examples of the method include a method of measuring from a cross-section image obtained using X-ray CT after curing the component [C], a method of measuring from an elemental analysis mapping image by an energy dispersive X-ray spectrometer (EDS), and a method of measuring from a cross-section observation image by an optical microscope, a scanning electron microscope (SEM), or a transmission electron microscope (TEM). In the observation, component [B] and/or component [C] may be dyed to adjust the contrast. In the image obtained by any of the above methods, the roughness average height Rc and the roughness average length RSm are measured in a range of 500 μm square. Especially, from the viewpoint that the content can be precisely measured, the amount is preferably measured by segmentation analysis.

An example of the method for measuring the roughness average height Rc and the roughness average length RSm of the cross-section curve is shown using FIG. 2. In the observation image 9 of FIG. 2, the resin area 7 containing the component [B] is in close contact with the resin area 8 containing the component [C], and the boundary between the resin areas is illustrated as the boundary 10 in the observation image 9. In addition, a plurality of components [A] 6 exist on the boundary 10. Then, a plurality of vertical base lines 12 are drawn from the resin area 8 containing the component [C] toward the resin area 7 containing the component [B] with an end 11 on a side of the resin area containing the component [C] of the rectangular observation image 9 as a reference line. At this time, the plurality of vertical base lines 12 are drawn at intervals of 5 μm in the reference line direction. Points at which the vertical baselines drawn from the reference line intersect the component [B] for the first time are plotted, and a line connecting the plotted points is defined as a cross-section curve 13. Filtering processing based on JIS B 0601 (2001) is performed on the obtained cross-section curve 13, and the roughness average height Rc and the roughness average length RSm of the cross-section curve 13 are calculated (hereinafter, this is referred to as "measurement method 1 for cross-section curve element").

<Method for Producing Fiber-Reinforced Plastic Substrate>

In the method for producing a fiber-reinforced plastic substrate according to the present invention, a drawing step, a first impregnating step, a second impregnating step, and a take-up step are continuously performed while the component [A] is caused to run.

Here, the phrase "continuously performed while the component [A] is caused to run" means causing the component [A] to run without stopping the component [A] with a roll or a belt and subjecting the component [A] to each step. When the drawing step, the first impregnating step, the second impregnating step, and the take-up step are continuously performed in this order, the production cost of the substrate can be reduced, and the economic efficiency is excellent.

This will be described in more detail with reference to FIG. 3. A fiber-reinforced plastic substrate 19 according to the present invention includes component [A] 14, one 15 of either the component [B] or the component [C], and the other 16 of the component [B] or the component [C], and is produced by a process continuously including at least a drawing step 22, a first impregnating step 23, a second impregnating step 24, and a take-up step 26. In the drawing step 22, a continuous reinforcing fiber sheet 17 containing the component [A] 14 is obtained; in the first impregnating step 23, a fiber-reinforced plastic intermediate 18 is obtained; and in the second impregnating step 24, a fiber-reinforced plastic substrate 19 is obtained. In addition, it is preferable to further incorporate a curing step 25 between the second impregnating step 24 and the take-up step 26. That is, by performing the steps 22 to 26 exemplified in FIG. 3 in a series of flows, a fiber-reinforced plastic substrate can be obtained with high productivity. However, the scope of the present invention is not limited to the steps exemplified in FIG. 3.

<Drawing Step>

In the present invention, the drawing step is a step of drawing a continuous reinforcing fiber sheet containing the component [A], and is, for example, a step of unwinding and aligning threads from a bobbin of the component [A] disposed on a creel or the like to obtain and guide a sheet-like continuous reinforcing fiber sheet. At that time, in order to adjust the basis weight and the width of the component [A], a fiber opening step may be incorporated before and/or after aligning the threads. After aligning the threads, a woven fabric obtained by using auxiliary fiber threads as weft threads may be guided as a continuous reinforcing fiber sheet through a loom. Auxiliary fibers at this time may be the same fibers as or different fibers from the component [A]. The continuous reinforcing fiber sheet is obtained from the threads and directly subjected to the next step, and thus the production cost is suppressed as compared with the case of warping or partial warping (beaming), which is preferable. Furthermore, a woven fabric formed in advance using the component [A] may be drawn. When the component [A] contained in the continuous reinforcing fiber sheet is disposed in one direction or disposed so as to cross like a woven fabric, a fiber-reinforced plastic substrate having excellent specific strength in the direction of the fibers as the component [A] is obtained. From the viewpoint of specific strength and cost, the components [A] contained in the continuous reinforcing fiber sheet are more preferably disposed in one direction.

The continuous reinforcing fiber sheet obtained in the drawing step of the present invention will be described with reference to FIG. 4. The continuous reinforcing fiber sheet 17 shown in FIG. 4 contains the component [A] 14, and the cross section thereof is shown in a cross section α. The continuous reinforcing fiber sheet has two opposing surfaces, a first surface 20 and a second surface 21: and in the first impregnating step and the second impregnating step which will be described later, each of the component [B] and the component [C] is impregnated from these surfaces. However, the scope of the present invention is not limited to the step exemplified in FIG. 4.

The thread of the component [A] may be composed of a plurality of fibers of the same form, or may be composed of a plurality of fibers of different forms. A number of the reinforcing fibers constituting the thread of one component [A] is usually 300 to 60,000, but is preferably 300 to 48,000, and more preferably 1,000 to 24,000 in consideration of the production of the substrate. The range of the number may be a combination of any of the above upper limits and any of the lower limits.

<First Impregnating Step>

The production method according to the present invention includes, after the drawing step, a step of impregnating either the component [B] or the component [C] from one surface of the continuous reinforcing fiber sheet to obtain a fiber-reinforced plastic intermediate in which either the component [B] or the component [C] is disposed on the first surface. The fiber-reinforced plastic intermediate obtained in the first impregnating step will be described with reference to FIG. 4 and FIG. 5. The one 15 of either the component [B] or component [C] is impregnated into the continuous reinforcing fiber sheet 17 from the first surface 20 in the cross section α in FIG. 4. As a result, the fiber-reinforced plastic intermediate 18 having a cross section such as a cross section in FIG. 5 is obtained. Here, the first surface 20 of the fiber-reinforced plastic intermediate 18 is covered with the one 15 of either the component [B] or the component [C] described above. However, the scope of the present invention is not limited to the step illustrated in FIG. 4 and FIG. 5. The sentence that "either the component [B] or the component [C] is disposed" means that 80% or more of the first surface is covered.

In the production method of the present invention, the component [B] may be impregnated in the first impregnating step and the component [C] may be impregnated in the later-described second impregnating step (hereinafter, referred to as a "first aspect"), or the component [C] may be impregnated in the first impregnating step and the component [B] may be impregnated in the later-described second impregnating step (hereinafter, referred to as a "second aspect").

[First Aspect]

In the first aspect, in the first impregnating step, the component [B] is disposed on one surface of the continuous reinforcing fiber sheet, and the continuous reinforcing fiber sheet is pressurized to impregnate the component [B] thereinto, thereby obtaining a fiber-reinforced plastic intermediate. Such a method is not particularly limited, and examples thereof include a method in which the component [B] is laminated in a sheet shape such as a film or a nonwoven fabric on the first surface of the continuous reinforcing fiber sheet, subsequently heated to be in a molten state, impregnated into the continuous reinforcing fiber sheet, and then cooled to obtain a fiber-reinforced plastic intermediate, and a method in which the component [B] is attached to the first surface of the continuous reinforcing fiber sheet in a molten state, subsequently impregnated into the continuous reinforcing fiber sheet, and then cooled to obtain a fiber-reinforced plastic intermediate. The method of forming the component [B] into a sheet shape is preferable because the basis weight of the component [B] can be stabilized; on the other hand, the method of applying the component [B] in a molten state to the continuous reinforcing fiber sheet is preferable from the viewpoint of production cost.

As a method of heating the sheet-shaped component [B] after laminating the component [B] on the first surface, a known method can be used. For example, a non-contact preheating method by a far infrared heater, a high-temperature oven, or induction heating, or a method of preheating the component [B] by bringing it into contact with a heated roll or belt is used. Especially, a method of passing it through a tank of a far-infrared heater or a high-temperature oven is preferable from the viewpoint of temperature control.

The method for attaching the molten component [B] to the first surface is not particularly limited, and a known method can be used. Especially, dipping or coating is preferable. Here, dipping refers to, for example, a method in which the component [B] is supplied to a melting bath by a pump and the continuous reinforcing fiber sheet is caused to pass through the melting bath. By immersing the continuous reinforcing fiber sheet in a melting bath, the component [B] can be reliably attached to the continuous strong fiber sheet. The coating refers to, for example, a method of applying the component [B] to the continuous reinforcing fiber sheet using a coating means such as a reverse roll, a forward rotating roll, a kiss roll, an applicator, a spray, or a curtain.

The reverse roll, the forward rotating roll, and the kiss roll refer to a method of supplying the molten component [B] by a pump to a roll and applying a melt of the component [B] to the continuous reinforcing fiber sheet. Furthermore, the reverse roll is a method in which two rolls rotate in opposite directions to each other to apply the molten component [B] onto the rolls, and the forward rotating roll is a method in which two rolls rotate in the same direction to apply the molten component [B] onto the rolls. Usually, for the reverse roll or the forward rotating roll, a method is used in which the component [B] is reliably attached by sandwiching the continuous reinforcing fiber sheet with the roll, transferring the component [B] onto the continuous reinforcing fiber sheet, and further sandwiching the continuous reinforcing fiber sheet with another roll. On the other hand, for a kiss roll, a method is used in which the component [B] is attached only by bringing the continuous reinforcing fiber sheet into contact with the roll. Therefore, the kiss roll is preferably used when the viscosity of the resin is relatively low. However, any of the roll methods can be used to apply a predetermined amount of the heated and molten component [B] and cause the continuous reinforcing fiber sheet to run while adhering the component [B] to the continuous reinforcing fiber sheet, thereby attaching a predetermined amount of the component [B] per unit length of the continuous reinforcing fiber sheet.

The spray is a method using the principle of atomization, which is a method in which the molten component [B] is sprayed in the form of mist onto the continuous reinforcing fiber sheet; the curtain is a method in which the molten component [B] is naturally dropped from a small hole to be applied, or a method in which the component [B] is overflowed from a melting tank to be applied. Since the amount required for application is easily adjusted, the loss of the component [B] can be reduced. The applicator discharges the molten component [B] from a small hole and causes the continuous reinforcing fiber sheet to run while bringing the continuous reinforcing fiber sheet into contact with the component [B], so that a predetermined amount of the component [B] can be attached per unit length of the continuous reinforcing fiber sheet. The applicator is preferably used from the viewpoint of being hardly affected by the viscosity of the component [B] and increasing the production speed.

Here, in the present invention, a ratio of a projected area of a through-hole of the component [B] to a projected area of the component [B] before impregnation is preferably within a range of 0 to 20% on the projection plane in the thickness direction of the fiber-reinforced plastic substrate. That is, when the component [B] is impregnated into the continuous reinforcing fiber sheet, it is preferable to set an area of the region where the component [B] is absent to be in a range of 0 to 20%, based on 100% of the area of the continuous reinforcing fiber sheet when projected in the thickness direction thereof. The area where the component [B] is absent is more preferably in a range of 0 to 10% from the same viewpoint. Such a configuration is preferable because the component [C] can be prevented from oozing out even on the outer surface on the component [B] side in the fiber-reinforced plastic substrate, and the surface stickiness of the fiber-reinforced plastic substrate can be reduced. This ratio can be determined by magnifying the continuous reinforcing fiber sheet with a laser microscope at a magnification of 100 times, determining the area of the component [B] from the observed field of view, and obtaining a difference from the observed field of view.

Further, the phrase "area of the region where the component [B] is absent is set to be in the range of 0 to 20%" means, in other words, that 80% or more of the first surface is covered with the component [B]. This makes it possible to impart excellent joinability to the fiber-reinforced plastic substrate. It is preferable that the first surface should be completely covered with the component [B], that is, the area of the region where the component [B] should be absent is set to 0%, because the component [C] can be prevented from being exposed to the first surface and/or going around when the component [C] is impregnated in the second impregnating step which will be described later.

The component [B] is appropriately pressurized simultaneously with or/and after attachment thereof to and melting thereof in the continuous reinforcing fiber sheet. A pressurization method is not particularly limited, but examples of the method include a method of applying pressure simultaneously with heating when the component [B] is heated by a reverse roll, a forward rotating roll, a kiss roll, an applicator, or a belt. Alternatively, a method of providing a pressurization portion formed of a roll or a belt after the component [B] is attached to and molten in the continuous reinforcing fiber sheet may be used. When the viscosity of the component [B] is low, pressurization is not necessarily required.

The fiber-reinforced plastic intermediate obtained by impregnating the component [B] into the continuous reinforcing fiber sheet is preferably cooled. The cooling method is not particularly limited, but a known method can be used. For example, non-contact cooling by a temperature control tank or a blower, or contact cooling by bringing the fiber-reinforced plastic intermediate into contact with a temperature controlled roll or belt can be used. Especially, the method of bringing the fiber-reinforced plastic intermediate into contact with a temperature controlled roll or belt is preferable from the viewpoint of temperature control, and is preferable because it can also serve as a pressurizing step after melting of the component [B].

[Second Aspect]

Next, a second aspect in the first impregnating step will be described. Such an aspect is an aspect in which the component [C] is impregnated in the first impregnating step, and the component [B] is impregnated in the second impregnating step which will be described later.

Examples of a method for impregnating the component [C] into the continuous reinforcing fiber sheet include a method in which the component [C] in a sheet shape is impregnated into the continuous reinforcing fiber sheet, and a method in which the component [C] in a molten state is impregnated into the continuous reinforcing fiber sheet (dipping or coating).

As a method of impregnating the component [C] in a sheet shape, the component [C] in a sheet shape such as a film or a nonwoven fabric can be laminated on the second surface and then impregnated by heating. For example, the component [C] can be preheated by a non-contact preheating method using a far-infrared heater, a high-temperature oven, induction heating, or by being brought into contact with a heated roll or belt. Especially, a method of passing it through a tank of a far-infrared heater or a high-temperature oven is preferable from the viewpoint of temperature control. By forming the component [C] into a sheet shape, the basis weight of the component [C] to be impregnated into the continuous reinforcing fiber sheet can be stabilized.

On the other hand, from the viewpoint of production cost, when the component [C] is impregnated into the continuous reinforcing fiber sheet, it is preferable that component [C] having a viscosity of less than 5 Pa·s should be impregnated by dipping or coating. In the second aspect, the first impregnating step preferably includes a first impregnating step (I) of attaching the component [C] to the continuous reinforcing fiber sheet, and further a first impregnating step (II) of pressurizing and impregnating the component [C] attached to the continuous reinforcing fiber sheet.

In the first impregnating step (I), the method for attaching the component [C] to the continuous reinforcing fiber sheet is preferably dipping or coating, and in particular, coating is more preferable. Among coatings, spray, curtain, and applicator are preferably used from the viewpoint of increasing the production speed. Furthermore, it is preferable to directly apply the component [C] to the continuous reinforcing fiber sheet without interposing an auxiliary material. Since the auxiliary material is unnecessary, economic efficiency is excellent.

Here, the dipping refers to a method in which the component [C] is supplied to a bath by a quantitative transport device such as a pump, and the continuous reinforcing fiber sheet is caused to pass through the bath in which the component [C] is in a molten state. By immersing the continuous reinforcing fiber sheet in the melting bath of the component [C], the component [C] can be reliably attached to the continuous reinforcing fiber sheet. The coating refers to, for example, a method of applying the component [C] to the continuous reinforcing fiber sheet using a coating means such as a reverse roll, a forward rotating roll, a kiss roll, an applicator, a spray, or a curtain.

The reverse roll, the forward rotating roll, and the kiss roll refer to a method of supplying the molten component [C] by a pump to a roll and applying a melt of the component [C] to the continuous reinforcing fiber sheet. Furthermore, the reverse roll is a method in which two rolls rotate in opposite directions to each other to apply the molten component [C] present on the rolls to the continuous reinforcing fiber sheet, and the forward rotating roll is a method in which two rolls rotate in the same direction to apply the molten component [C] onto the rolls. Usually, for the reverse roll or the forward rotating roll, a method is used in which the continuous reinforcing fiber sheet is sandwiched, and further pressurized with a roll to reliably attach the component [C] thereto. On the other hand, for a kiss roll, a method is used in which the component [C] attached only by bringing the continuous reinforcing fiber sheet into contact with the roll. Therefore, the kiss roll is preferably used when the viscosity of the resin is relatively low. However, any of the roll methods can be used to apply a predetermined amount of the heated and molten component [C] and cause the continuous reinforcing fiber sheet to run while adhering the component [C] to the continuous reinforcing fiber sheet, thereby attaching a predetermined amount of the component [C] per unit length of the continuous reinforcing fiber sheet.

The spray is a method using the principle of atomization, which is a method in which the molten component [C] is sprayed in the form of mist onto the continuous reinforcing fiber sheet; the curtain is a method in which the molten component [C] is naturally dropped from a small hole to be applied, or a method in which the component [C] is overflowed from a melting tank to be applied. Since the amount required for application is easily adjusted, the loss of the component [C] can be reduced. The applicator discharges the molten component [C] from a small hole and causes the continuous reinforcing fiber sheet to run while bringing the continuous reinforcing fiber sheet into contact with the component [C] or interposing a certain space, so that a predetermined amount of the component [C] can be attached per unit length of the continuous reinforcing fiber sheet. The applicator is preferably used from the viewpoint of being hardly affected by a viscosity of the component [C] and increasing the production speed.

In the first impregnating step (I), it is preferable to apply the component [C] so that a projected area of the component [C] when projected in a running direction of the fiber-reinforced plastic substrate is set to be in a range of 80 to 120% with respect to the projected area of the component [A] in the fiber direction, because the component [C] is easily impregnated into the fiber-reinforced plastic intermediate in the subsequent first impregnating step (II). Therefore, when the component [C] is impregnated into the continuous reinforcing fiber sheet, the component [C] is applied such that, in the obtained fiber-reinforced plastic intermediate, the projected area of the component [C] when projected in a running direction thereof is within 80 to 120% with respect to the projected area of the component [A]. When the projected area is 80% or more, the number of sites where the component [C] is not present in the fiber-reinforced plastic intermediate, that is, sites where the component [C] is not impregnated into the fiber-reinforced plastic intermediate can be further reduced, which is preferable. When the projected area is 120% or less, contamination around the apparatus caused by significant failing off of the component [C] out of the projected area of the fiber-reinforced plastic substrate can be reduced, and the amount of the component [C] that is not used in the fiber-reinforced plastic substrate but falls off can be reduced, so that the yield is good, and the economic efficiency is excellent, which is preferable. More preferably, it is in a range of 90 to 110%.

The viscosity of the component [C] in the first impregnating step (I) is preferably less than 5 Pa·s. The viscosity is more preferably 1 Pas or less. A lower limit value is not particularly limited, but when the lower limit value is 0.001 Pa·s or more, it is possible to avoid significant thermal decomposition of the component [C] and impregnate the component [C]. Within such a range, not only the impregnation property can be improved, but also the contact resistance to the component [C] on the surface of the component [A] due to the resin viscosity with a tool such as a roll or an applicator is reduced when the component [C] is applied or/and pressurized while the roll or the applicator is in contact with the component [C]; as a result, the tension of the continuous reinforcing fiber sheet can be reduced, and the production speed can be increased. The observation temperature of the viscosity of the component [C] can be evaluated by observing an observation temperature at the time when the viscosity of the thermosetting resin is the lowest when the temperature is raised from 40° C. to 250° C. at a rate of 1.5° C./min, using a rheometer (rotary dynamic viscoelasticity measuring apparatus).

As the first impregnating step (II), it is preferable that the continuous reinforcing fiber sheet to which the component [C] is applied is rubbed, nipped, or tensioned by a roll, a belt, a plate, or the like simultaneously with or after the melting of the component [C], so as the component [C] is pressurized in an inner direction of a yarn bundle of the component [A] to impregnate the component [C] into the continuous reinforcing fiber sheet. By adopting such a method, the impregnation property of the component [C] into the continuous reinforcing fiber sheet can be enhanced without reducing the running speed. From the viewpoint of simplicity of the impregnation mechanism, a mechanism using rubbing or a roll can be preferably used.

[Temperature of Fiber-Reinforced Plastic Intermediate]

A temperature of the fiber-reinforced plastic intermediate immediately after the first impregnating step is preferably 70 to 180° C. in both the first aspect and the second aspect. In addition, the temperature of the intermediate immediately before the second impregnating step is more preferably in the above range. Within such a range, thermal decomposition or reaction runaway of the fiber-reinforced plastic intermediate by heat of the impregnation resin (the other of the component [B] and the component [C]) in the second impregnating step which will be described later hardly occurs, and at the same time, the resin (the other of the component [B] and the component [C]) is heated, so that the impregnation property into the fiber-reinforced plastic intermediate is improved. From the viewpoint of reliably preventing thermal decomposition or reaction runaway, the temperature of the intermediate is more preferably 150° C. or lower. From the viewpoint of improving the impregnation property, a lower limit of the temperature is more preferably 90° C. or higher.

<Second Impregnating Step>

The production method according to the present invention includes, after the first impregnating step, a step of impregnating the other of the component [B] or the component [C] from a second surface opposite to the first surface to obtain a fiber-reinforced plastic substrate. That is, when the component [B] is impregnated in the first impregnating step described above, the component [C] is impregnated in the second impregnating step (referred to as a "first aspect"); when the component [C] is impregnated in the first impregnating step described above, the component [B] is impregnated in the second impregnating step (referred to as a "second aspect"). Referring to FIGS. 5 and 6, the other 16 of the component [B] or the component [C] is impregnated into the fiber-reinforced plastic intermediate 18 obtained in the first impregnating step described above, from the second surface 21, so that the fiber-reinforced plastic substrate 19 having a cross section like a cross section γ in FIG. 6 is obtained. In general, since the melting temperature of the thermoplastic resin is often higher than the curing temperature of the thermosetting resin, in the first aspect in which the component [B] is impregnated as the first impregnating step and the component [C] is impregnated as the second impregnating step, the risk of thermal decomposition of the component [C] accompanying heating for melting and impregnating the component [B] can be reduced. However, the scope of the present invention is not limited to the step illustrated in FIG. 5 or/and FIG. 6. Hereinafter, the second impregnating step in the first aspect will be described.

[First Aspect]

In the first aspect, the component [C] is impregnated in the second impregnating step. A method for impregnating the component [C] from the second surface opposite to the first surface of the fiber-reinforced plastic intermediate is substantially the same as the impregnation method for the component [C] described as [Second aspect] in <First impregnating step> except that the application surface is different. Therefore, a method of impregnating the component [C] in a sheet shape, a method of impregnating the component [C] in a molten state (dipping or coating), and the like can be indicated. Especially, the component [C] in a molten state with a viscosity of less than 5 Pa·s is preferably applied to the second surface of the fiber-reinforced plastic intermediate by dipping or coating to impregnate the component [C] into the second surface. By applying the component [C] in a molten state to the fiber-reinforced plastic intermediate, the production cost can be suppressed.

The method for attaching the component [C] to the fiber-reinforced plastic intermediate is preferably dipping or coating. Especially, coating is more preferable; among the coatings exemplified as described above, a spray, a curtain, and an applicator are preferably used from the viewpoint of increasing the production speed. In addition, when the component [C] is applied by dipping and the component [C] is attached onto the first surface impregnated with the component [B], it is preferable to further incorporate a step of wiping off the component [C] attached onto the component [B]. The presence of the component [B] on the surface can ensure the joinability of the fiber-reinforced plastic substrate developed.

When the component [C] is attached to the fiber-reinforced plastic intermediate, the component [C] is preferably applied such that the projected area of the component [C] when projected in the running direction of the fiber-reinforced plastic substrate is within a range of 80 to 120% with respect to the projected area of the component [A] in the fiber direction. When the content is within such a range, impregnation of the component [C] into the fiber-reinforced plastic intermediate is facilitated. Therefore, when the component [C] is impregnated into the fiber-reinforced plastic intermediate, the component [C] is applied such that, in the obtained fiber-reinforced plastic substrate, the projected area of the component [C] when projected in a running direction thereof is within 80 to 120% with respect to the projected area of the component [A]. When the projected area is 80% or more, the number of sites where the component [C] is not present in the fiber-reinforced plastic substrate, that is, sites where the component [C] is not impregnated into the fiber-reinforced plastic intermediate can be reduced, which is preferable. When the projected area is 120% or less, contamination around the apparatus caused by significant falling off of the component [C] out of the projected area of the fiber-reinforced plastic substrate can be reduced, and the amount of the component [C] that is not used in the fiber-reinforced plastic substrate but falls off can be reduced, so that the yield is good, and the economic efficiency is excellent. More preferably, it is in a range of 90 to 110%.

In the second impregnating step, the viscosity of the component [C] is preferably less than 5 Pa·s. The viscosity is more preferably 1 Pa·s or less. Within such a range, not only the impregnation property can be improved, but also the tension of the fiber-reinforced plastic intermediate can be reduced by reducing the resistance to a tool such as a roll or an applicator when the component [C] is applied or/and pressurization is performed while the roll or the applicator is in contact with the component [C], and the production speed can be increased. A lower limit value is not particularly limited, but when the lower limit value is 0.001 Pa·s or more, it is possible to avoid significant thermal decomposition of the component [C] and impregnate the component [C].

In addition, as the second impregnating step, it is preferable that the fiber-reinforced plastic intermediate to which the component [C] is attached should be rubbed, nipped or tensioned by a roll, a belt, a plate, or the like simultaneously with or after the melting of the component [C], so as the component [C] is pressurized in the inner direction of the yarn bundle of the component [A] to impregnate the component [C] into the fiber-reinforced plastic intermediate. By this method, the impregnation property of the component [C] into the fiber-reinforced plastic intermediate can be enhanced without reducing the running speed. From the viewpoint of simplicity of the impregnation mechanism, a mechanism using rubbing or a roll can be preferably used.

After the component [C] is impregnated as described above, a layer of resin area containing the same component [B] as described above may be further provided on the surface of a layer of the resin area containing the component [C]. By providing the component [B] on both surfaces, warpage of the fiber-reinforced plastic substrate can be reduced.

[Second Aspect]

Next, a second aspect in the second impregnating step will be described. Such an aspect is an aspect in which the component [C] is impregnated in the first impregnating step described above, and the component [B] is impregnated in the second impregnating step. In such an aspect, the component [B] is impregnated from the second surface opposite to the first surface impregnated with the component [C] in the first impregnating step described above. The second impregnating step preferably includes a second impregnating step (I) of disposing the component [B] on a surface of the fiber-reinforced plastic intermediate and a second impregnating step (II) of obtaining a fiber-reinforced plastic substrate by pressurization.

In the second aspect, it is also preferable to further provide a layer of a resin area containing the component [B] on the surface (that is, the first surface side) of the layer of the resin area containing the component [C] at the time of or after impregnation of the component [B] from the second surface opposite to the first surface impregnated with the component [C]. In this way, as shown in FIG. 7, the component [B] is preferably disposed also on the first surface side. By providing the component [B] on both surfaces, warpage of the fiber-reinforced plastic substrate can be reduced.

A method for disposing the component [B] on the second surface (preferably both surfaces) of the fiber-reinforced plastic intermediate is not particularly limited, but examples thereof include a method in which the component [B] is disposed on the second surface (preferably both surfaces) of the fiber-reinforced plastic intermediate in a molten state, and subsequently cooled. The method of applying the component [B] in a molten state to the continuous sheet-like component [A] is preferable from the viewpoint of production cost. In addition, a method of arranging the component [B] as a fiber bundle similarly to the component [A] is also exemplified. In this case, the same creel as that for the component [A] can be used, and thus the scale of equipment does not become large. Therefore, the method is preferable. Furthermore, a method of forming the component [B] into a sheet shape of a film or a nonwoven fabric is also exemplified. It is preferable that a wound body of the component [B] processed into a film, a sheet, or a nonwoven fabric should be unwound in accordance with the running speed of the fiber-reinforced plastic intermediate during running, and sequentially laminated, since it is convenient in terms of the apparatus and the basis weight of the component [B] can be stabilized without fine condition adjustment.

The components [B] in a sheet shape or as a fiber bundle are laminated and disposed on the fiber-reinforced plastic intermediate and then heated, and a known method can be used as a method thereof. For example, the component [B] can be preheated by a non-contact preheating method using a far infrared heater, a high-temperature oven, or induction heating, or by bringing it into contact with a heated roll or belt. Especially, a method of passing it through a tank of a far-infrared heater or a high-temperature oven is preferable from the viewpoint of temperature control.

On the other hand, a method for disposing the molten component [B] is not particularly limited, but a known method can be used. Especially, dipping or coating can be preferably used. For dipping and coating, the same method as that for the component [C] can be adopted.

In the second impregnating step (I), the ratio of the projected area of the through-hole of the component [B] to the projected area of the component [B] (including the through-hole part) is preferably within the range of 0 to 20% on the projected plane in the thickness direction of the fiber-reinforced plastic substrate. That is, when the component [B] is impregnated into the fiber-reinforced plastic intermediate, the region where the component [B] is absent is preferably within the range of 0 to 20% based on 100% of the area of the fiber-reinforced plastic intermediate when projected in the thickness direction thereof. Such a configuration is preferable because the component [C] can be prevented from oozing out even on the outer surface on the component [B] side in the fiber-reinforced plastic substrate, and the surface stickiness of the fiber-reinforced plastic substrate can be reduced. The area where the component [B] is absent is more preferably in a range of 0 to 10% from the same viewpoint. The ratio can be determined by cutting out the fiber-reinforced plastic substrate that has passed through the second impregnating step (I), magnifying the surface of the component [B] with a laser microscope at a magnification of 100 times, determining the area of the component [B] from an observed field of view, obtaining a difference from the observed field of view, and dividing the difference by the area of the entire observed field of view.

Furthermore, in the second impregnating step (I), it is preferable that the component [B] should cover all of both surfaces of the fiber-reinforced plastic intermediate, and that, in a direction orthogonal to the fiber orientation direction of the fiber-reinforced plastic intermediate, the component [B] should be disposed so as to cover a range of 0 to 5 mm from both ends of the fiber-reinforced plastic intermediate to an outside in the orthogonal direction. This is preferable because the area of the fiber-reinforced plastic intermediate covered with the component [B] is Increased and protrusion of the fiber-reinforced plastic substrate is reduced. As a result, the component [C] remaining on the surface of the fiber-reinforced plastic Intermediate does not come into contact with a roller or the like in the process, and not only instability of the basis weight of the component [C] can be reduced, but also running stability inhibited due to stickiness of the component [C] can be improved. The range is more preferably in the range of 0 to 3 mm from the viewpoint of reducing the amount of the component [B] used and improving economic efficiency.

The second impregnating step (II) preferably includes a step of pressurizing the fiber-reinforced plastic intermediate in which the component [B] is disposed. The method for pressurizing the fiber-reinforced plastic intermediate is not particularly limited, and is performed by a known method. Especially, the second impregnating step (II) is preferably a method of rubbing, nipping, tension application, or pressing from the viewpoint of improving the adhesion between the fiber-reinforced plastic intermediate and the component [B]. In particular, in the case of the nipping and pressing methods, since the pressurization force is directly applied to the fiber-reinforced plastic Intermediate and the component [B], the adhesion between the fiber-reinforced plastic intermediate and the component [B] can be made uniform, which is preferable. Furthermore, heating in accordance with pressurization is preferable because adhesion is improved by melting of the component [B] and softening of the component [C]. As the heating means, a known method can be employed. For example, the component [B] can be preheated by a non-contact preheating method using a far infrared heater, a high-temperature oven, or induction heating, or by bringing it into contact with a heated roll or belt. Especially, a method of passing it through a tank of a far-infrared heater or a high-temperature oven is preferable from the viewpoint of temperature control.

In the second impregnating step (II), it is preferable to perform pressurization while heating the component [B] disposed in the fiber-reinforced plastic intermediate at a temperature lower than the decomposition temperature of the component [C]. Thus, the adhesion between the fiber-reinforced plastic intermediate and the component [B] can be further improved. The temperature in the step is preferably lower than the decomposition temperature of the component [C] from the viewpoint of preventing deterioration in characteristics of the component [C] in the finished fiber-reinforced plastic substrate, and more preferably at least 100° C. lower than the decomposition temperature from the viewpoint of maintaining the characteristics of the component [C]. The decomposition temperature of the component [C] can be measured using a general thermogravimetric apparatus (TG-DTA) in a temperature range of 50° C. to 450° C. at a temperature increase rate of 10° C./min in a nitrogen atmosphere; in the present invention, a point at which weight loss reaches 5% defined as the decomposition temperature.

[Degree of Cure of Component [C]]

In the fiber-reinforced plastic substrate obtained in the present invention, a degree of cure of the component [C] obtained by DSC before the curing step which will be described later is preferably 50% or less. Here, the degree of cure is a value determined by the following formula (2), in which a curing calorific value (H0) of the component [C] immediately after preparation of the resin and a residual calorific value (H1) of the fiber-reinforced plastic substrate immediately after the take-up step are evaluated by differential scanning calorimetry under an inert gas atmosphere at a temperature increase rate of 10° C./min, and areas of peaks appearing as exothermic reactions are calculated as respective calorific values.

$$\text{Degree of cure } (\%) = [(H0 - H1 \div Wr) \times 100 / H0] \qquad (2)$$

Wr represents a mass content rate of the component [C] contained in the fiber-reinforced plastic substrate. A method for measuring the mass content rate Wr is not particularly limited, but, for example, a mass W1 of the fiber-reinforced plastic substrate after curing the component [C] of the fiber-reinforced plastic substrate, a mass W2 after removing the component [B] in the fiber-reinforced plastic substrate with a solvent or the like, and a mass W3 after heating at 500° C. for 1 hour in air to burn off the resin component are measured, and the mass Wr is determined by the following formula (3).

$$Wr(\%)=(W3-W2)/W1 \qquad (3)$$

Within such a range, tackiness can be imparted to the fiber-reinforced plastic substrate of the present invention. When the fiber-reinforced plastic substrate has tackiness, the fiber-reinforced plastic substrate of the present invention and a fiber-reinforced plastic substrate such as another prepreg adhere to each other at the time of lamination, so that the fiber direction is hardly shifted, and a laminate having excellent mechanical characteristics is obtained.

<Curing Step>

[Curing]

The production method according to the present invention may include a step of curing the component [C] by heating the fiber-reinforced plastic substrate after the second impregnating step. By incorporating such a curing step, when an integrated molding with an injection resin or the like is molded using the fiber-reinforced plastic substrate obtained by the production method according to the present invention, it is not necessary to heat the fiber-reinforced plastic substrate before and after the integral molding in order to cure the component [C] of the fiber-reinforced plastic substrate. Furthermore, the handleability of the fiber-reinforced plastic substrate is also improved, which is preferable.

The curing step may be incorporated between the second impregnating step and the take-up step, or may be incorporated after the take-up step. Preferably, the curing step is provided between the second impregnating step and the take-up step.

As a heating method to cure the component [C], a known method can be used. For example, the component [B] can be preheated by a non-contact preheating method using a far infrared heater, a high-temperature oven, or induction heating, or by bringing it into contact with a heated roll or belt. Especially, a method of passing it through a tank of a far-infrared heater or a high-temperature oven is preferable from the viewpoint of temperature control.

Furthermore, in the curing step, the fiber-reinforced plastic substrate may be heated and cured while being pressurized. This is preferable because voids in the fiber-reinforced plastic substrate can be reduced. The pressurization method is not particularly limited, and examples thereof include pressurization with a roll or a belt.

[Degree of Cure of Component [C] (after Curing Step)]

The component [C] subjected to the curing step preferably has a degree of cure obtained by the above formula (2) of more than 50%. Alternatively, whether or not the cured product is substantially completely cured may be confirmed by a known method, without using the formula (2), to determine whether or not the degree of cure is obviously more than 50%. Originally, it is preferable to additionally cover the surface of the fiber-reinforced plastic substrate with a mold release film or a protective film, but, by setting the degree of cure of the component [C] subjected to the curing step to such a range, it is not necessary to additionally cover the component [B] or the component with a mold release film or a protective film, and handleability is improved. For example, a mold release film or a protective film may directly cover the substrate for different reasons, of course. The degree of cure is more preferably in a range of 80% or more. Within such a range, when an integrated molding with an injection resin or the like is molded using the fiber-reinforced plastic substrate, a time for heating the fiber-reinforced plastic substrate before and after the integral molding in order to cure the component [C] of the fiber-reinforced plastic substrate can be reduced.

<Take-Up Step>

The production method according to the present invention includes a step of taking up the fiber-reinforced plastic substrate after the second impregnating step. The curing step described above may be provided between the second impregnating step and the take-up step.

In the take-up step, the fiber-reinforced plastic substrate may be wound around a winding section, or may be introduced into a device such as an ATP device, an AFP device, a slit device, or a cutting device without being wound and continuously subjected to another step. In the case of winding, a mold release paper or a protective film may be supplied to the first surface or the second surface of the fiber-reinforced plastic substrate. Supplying the mold release paper or the protective film is preferable because the component [C] present on the second surface can be prevented from adhering to the first surface of the fiber-reinforced plastic substrate present on the inner layer at the time of winding.

A speed at the time of taking up the fiber-reinforced plastic substrate is preferably 0.1 m/min or more. Within such a range, a fiber-reinforced plastic substrate can be continuously obtained. The speed is more preferably 1 m/min or more from the viewpoint of productivity, and more preferably 5 m/min or more from the viewpoint of process requirements for structural members.

<Integrated Molding>

The integrated molding of the present invention is obtained by joining another member to the fiber-reinforced plastic substrate, that is, by joining a member (adherend) of the same type as and/or a different type from the member constituting the fiber-reinforced plastic substrate to the component [B] present on the surface of the fiber-reinforced plastic substrate, and integrating (welding) the member with the fiber-reinforced plastic substrate through the component [B]. Examples of the member (adherend) of different type Include members made of thermoplastic resin and members made of metal material. The member made of the thermoplastic resin may contain reinforcing fibers, fillers, and the like. An integration method is not particularly limited, and examples thereof include thermal welding, vibration welding, ultrasonic welding, laser welding, resistance welding, induction welding, insert injection molding, and outsert injection molding.

<Application>

The integrated molding of the present invention is preferably used in aircraft structural members, wind blades, automobile external plates, and computer applications such as IC trays and housings of notebook computers, and in sports applications such as golf shafts and tennis rackets.

EXAMPLES

Hereinafter, the present invention will be described in more detail with reference to Examples. However, the scope of the present invention is not limited to these Examples. The unit "part" of the composition ratio means part by mass, unless otherwise noted. In addition, measurement of various characteristics was performed under an environment of a temperature of 23° C. and a relative humidity of 50%, unless otherwise noted.

(1) Degree of Cure

A degree of cure was measured by the above formula (2) using a differential scanning calorimeter (DSC) (Q 2000 equipped with RCS (mechanical refrigeration cooling system), manufactured by TA Instruments).

(2) Amount of Component [A] in Resin Area of Component [C]

A fiber-reinforced plastic substrate is sandwiched between surfaces of two smooth polytetrafluoroethylene resin plates, and a thermosetting resin in the fiber-reinforced plastic substrate is gradually cured at 40° C. for 10 days. After curing, a small piece of 10 mm×1 mm is cut out from the fiber-reinforced plastic substrate, and photographed at a FOV of 500 µm by an X-ray CT apparatus to perform segmentation analysis. As a measuring apparatus, an X-ray microscope "nano 3DX®" (manufactured by Rigaku Corporation) was used. From the analysis result, a ratio [%] of component [A] present in a resin area of component [C] to a total volume of the component [A] was calculated. A number of measurements was n=3, and an average value was defined as an amount [%] of the component [A] in the resin area of the component [C].

(3) Impregnation Rate

In a cross section of the fiber-reinforced plastic substrate orthogonal to a fiber axial direction of the component [A], a cross-section image at a magnification of 500 was taken using an optical microscope, and an impregnation rate was measured on the basis of the formula (1). A number of measurements was n=5, and an average value was defined as the impregnation rate.

(4) Productivity

From a take-up speed at the time of production, a number of times of breakage of the component [A], a number of steps, and the like, a producible quantity per unit time was comprehensively determined. Relative evaluation was performed based on four grades: a sample in which an amount of the fiber-reinforced plastic substrate obtained per 10 minutes was 250 g or more was rated as A (particularly good), a sample in which the amount was 100 g to 250 g was rated as B (good), a sample in which the amount was 50 g to 100 g was rated as C (normal), and a sample in which the amount was less than 50 g was rated as D (poor).

(5) Specific Strength

Specific strength was determined by the following formula.

Specific strength $[MPa/(g/cm^3)]$=tensile strength $[MPa]$/density $[g/cm^3]$

Tensile strength was measured according to the ISO 527-3 method (1995) by cutting out a test piece from a fiber-reinforced composite material which will be described later.

The test piece cut out in the direction of the fibers as the component [A] in the production method of the present invention was prepared, a number of measurements was n=5, and an average value was defined as the tensile strength. As a measuring apparatus, "Instron®" 5565 universal material testing machine (manufactured by Instron Japan Co., Ltd.) was used.

A density was measured according to the JIS K 7112: A method (1999).

(6) Roughness Average Length RSm and Roughness Average Height Rc

The fiber-reinforced plastic substrate was used, and an image at a magnification of 1000 of a cross section cut perpendicular to a plane direction of a prepreg (fiber-reinforced plastic substrate) at an angle of 45 degrees in a plan view with respect to a direction of an arbitrary fiber as [A] contained in both the resin area containing the component [B] and the resin area containing the component [C] was taken using an optical microscope. In an arbitrary observation range of 500 µm square in the obtained image, a number of measurements of a roughness average length RSm and a roughness average height Rc as defined in JIS B 0601 (2001) of a cross-section curve element obtained by the measurement method 1 of the cross-section curve element was set to n=5, and average values were set to the roughness average length RSm and the roughness average height Rc.

(7) Flexural Modulus, Flexural Strength

Flexural modulus and flexural strength of an integrated molding and an injection molding were measured according to the ISO 178 method (2001) at room temperature (25° C.) As a test piece, a test piece cut out in the direction of the fibers as the component [A] was prepared, a number of measurements was n=5, and average values were defined as the flexural modulus [GPa] and the flexural strength [MPa].

(8) Ratio of Through-Holes (Region where Component [B] was Absent) in Component [B]

A portion of the component [B] was collected from the fiber-reinforced plastic substrate that had passed through the second impregnating step (I) in a width of 10 mm×a length of 10 mm as a sample. The sample was magnified 100 times with a laser microscope (VK-9510 manufactured by KEYENCE CORPORATION), and images were taken at 10 randomly selected sites (their visual fields did not overlap each other). An area of a hole portion was determined from the taken images, and divided by an area of the entire observation image to derive individual values, and a ratio of the through-holes was obtained by simply averaging these values.

(9) Resin Viscosity

A shear viscosity of the component [C] was evaluated by observing an observed temperature and a shear viscosity at the time when the viscosity of the component [C] was the lowest when the temperature was raised from 40° C. to 250° C. at a rate of 1.5° C./min using a rheometer (rotary dynamic viscoelasticity measuring apparatus).

(10) Applied Area Ratio of Component [C] Applied to Continuous Reinforcing Fiber Sheet At the time of production, continuous reinforcing fiber sheets after application of the component [C] thereto were collected at 10 points with intervals of 1 m. A piece having a width of 20 mm and a length of 20 mm was collected from each of the collected continuous reinforcing fiber sheets to which the component [C] was applied, and used as a sample. The sample was magnified 100 times with a laser microscope (VK-9510 manufactured by KEYENCE CORPORATION), and images were taken at 10 randomly selected sites (their visual fields did not overlap each other). From the contrast of the taken images, an area of the site to which the component [C] was attached was determined, and divided by the area of the entire observation image to derive individual values, and an applied area ratio was obtained by simply averaging these values.

(11) Line Speed

As a line speed at the time of production, a fiber-reinforced plastic substrate having a length of 1000 m was produced, and a speed at which breakage of the component [A] did not occur was defined as a line speed.

(12) Peeling Force of Component [B]

According to JIS Z 0237 (2009), the fiber-reinforced plastic substrate was cut into a piece having a width of 10 mm and a length of 100 mm to prepare a sample. This sample was fixed to a flat plate made of an SUS material so that the component [B] was in contact with the SUS material to prepare a test piece. For this test piece, the component [B] on one side was peeled off in a direction of 180 degrees at a speed of 1000 mm/min, and a simple average value of loads at that time was defined as adhesive strength. A number of measurements was n=5, and an average value was defined as the adhesive strength.

(13) Handleability of Fiber-Reinforced Plastic Substrate

Handleability was comprehensively determined from the continuous productivity of the fiber-reinforced plastic substrate, the number of occurrences of fiber fluff, and the stickiness of the surface of the fiber-reinforced plastic substrate. For the continuous productivity, a production cycle per 100 m of the fiber-reinforced plastic substrate when 1000 m thereof was produced was measured, and a sample in which an average production cycle at n=10 was 25 m/min or more was regarded as good. For the number of fiber fluffs generated, a sample in which the number of visible fluffs per 1 m was 50 or less was rated as good; for the surface stickiness, a sample in which there was no trouble derived from the surface stickiness and the wound body 100 m could be unwound was rated as good. The samples were relatively evaluated based on three grades: a sample having good results was ranked as A (particularly good), a sample having poor one of the results was ranked as B (good), and a sample having poor two or more of the results was ranked as C (poor).

(14) Materials and Instruments Used

[Carbon Fiber (1)]

A copolymer mainly composed of polyacrylonitrile was subjected to spinning, a firing treatment, and a surface oxidation treatment to obtain a continuous carbon fiber having a total of 12,000 monofilaments. The characteristics of the continuous carbon fiber were as follows.

Single filament diameter: 7 μm
Density: 1.8 g/cm$^3$
Tensile strength: 4600 MPa
Tensile modulus: 220 GPa

[Glass Fiber (1)]

A continuous E-glass fiber with a total of 1,600 monofilaments subjected to a bundling treatment was used. The properties of the continuous E-glass fiber were as follows.

Single filament diameter: 13 μm
Tensile strength: 3400 MPa
Tensile modulus: 72 GPa
Tensile elongation: 3%
Density: 2.6 g/cm$^3$

[Woven Fabric (1)]

As a woven fabric, a carbon fiber woven fabric "TORAYCA®" C06343 (manufactured by Toray Industries, Inc.) was used. The characteristics of this woven fabric were as follows. The carbon fiber used in the woven fabric (1) are referred to as a carbon fiber (2).

Single filament diameter: 7.0 μm
Weave: plain weave
Basis weight: 200 g/m$^2$

[Reinforcing Fiber Mat (1)]

The carbon fiber (1) was cut into 5 mm with a cartridge cutter to obtain a chopped carbon fiber. A dispersion liquid containing water and a surfactant (Polyoxyethylene Lauryl Ether (trade name) manufactured by NACALAI TESQUE, INC.) with a concentration of 0.1 mass % was prepared, and a reinforcing fiber mat (1) was produced from the dispersion liquid and chopped carbon fibers using an apparatus for producing a reinforcing fiber mat. The production apparatus includes a cylindrical container having a diameter of 1000 mm and having an opening cock at a lower part of the container as a dispersion tank, and a linear transportation unit (inclination angle: 30°) that connects the dispersion tank and a papermaking tank. A stirrer is attached to an opening on an upper surface of the dispersion tank, and chopped carbon fibers and dispersion liquids (dispersion media) can be introduced from the opening. The papermaking tank is a tank including a mesh conveyor having a papermaking surface having a width of 500 mm at the bottom, and a conveyor capable of conveying a carbon fiber substrate (papermaking substrate) is connected to the mesh conveyor. Papermaking was performed at a carbon fiber concentration in the dispersion of 0.05 mass %. The carbon fiber substrate subjected to papermaking was dried in a drying furnace at 200° C. for 30 minutes to obtain a reinforcing fiber mat (1). A basis weight of the obtained mat was 200 g/m$^2$.

[PA-Based Resin]

As a PA-based resin, "AMILAN®" CM4000 (manufactured by Toray Industries, Inc.), a terpolymer polyamide resin was used.

[PA6 Resin (1)]

As a PA6 resin, "AMILAN®" CM1001 (manufactured by Toray Industries, Inc.) was used.

[PA6 Resin (2)]

As the PA6 resin, "AMILAN®" CM1007 (manufactured by Toray industries, Inc.) was used.

[PA6 Injection Resin]

As a PA6 injection resin, "AMILAN®" CM1011G-45 (manufactured by Toray Industries, Inc.) was used.

[PEEK Resin]

As a PEEK resin, "KEPSTAN®" 7002 (manufactured by Arkema K.K.) was used.

[PP Resin (1)]

A resin containing 80 mass % of an unmodified polypropylene resin ("Prime Polypro®" J105G manufactured by Prime Polymer Co., Ltd.) and 20 mass % of an acid-modified polypropylene resin ("Admer" QB 510 manufactured by Mitsui Chemicals, Inc.) was used.

[PP Resin (2)]

An unmodified polypropylene resin ("Prime Polypro®" J105G manufactured by Prime Polymer Co., Ltd.) was used.

[PC Resin]

As a PC resin, "Lexan®" 1418 (manufactured by Japan GEP Corporation) was used.

[EP Resin]

An EP resin was prepared using the following compounds.

(1) Epoxy Resin
  Bisphenol A type epoxy resin ("jER®" 825, manufactured by Mitsubishi Chemical Corporation), epoxy equivalent: 175 (g/eq.))
  Phenol novolak type epoxy resin ("jER®" 154, manufactured by Mitsubishi Chemical Corporation), epoxy equivalent: 178 (g/eq.))
(2) Amine Compound
  Dicyandiamide (DICY7, manufactured by Mitsubishi Chemical Corporation)
(3) Curing Catalyst
  Toluene bis(dimethylurea) ("OMICURE®" U-24M, manufactured by CVC Thermoset Specialties)
(4) Viscosity Modifier
  Polyvinyl formal ("VINYLEC®" K manufactured by JNC Corporation)
(5) Method for Preparing Epoxy Resin (Component [C])

Fifty (50) parts by mass of "jER®" 825, 50 parts by mass of "jER®" 154, and 3 parts by mass of polyvinyl formal were charged into a kneading apparatus, and heated and kneaded to dissolve the polyvinyl formal. Subsequently, the temperature was lowered to 100° C. or lower while continuing the kneading, and 5 parts by mass of DICY7 and 2 parts by mass of OMICURE U-24M were added and stirred to obtain an EP resin.

[PPS Resin Nonwoven Fabric (1)]

PPS resin pellets were processed by a melt blown method to obtain a nonwoven fabric. A basis weight of this nonwoven fabric was 23 $g/m^2$.

[PEs Resin Sheet (1)]

"Lumirror®" S10 (manufactured by Toray Industries, Inc., film having a basis weight of 50 $g/m^2$ (melting point: 260° C.) made of a PEs resin was used.

[PP Resin Sheet (1)]

Using the PP resin (2), a film having a basis weight of 136 $g/m^2$ (melting point: 162° C.) was prepared.

[PA6 Resin Sheet (1)]

A sheet made of the PA6 resin (1) and having a basis weight of 40 $g/m^2$ was prepared.

[PA-Based Resin Nonwoven Fabric (1)]

The PA-based resin was processed by a melt blown method to obtain a nonwoven fabric. When this nonwoven fabric was prepared, a discharge amount was adjusted to prepare four types of nonwoven fabrics having basis weights of 136 $g/m^2$, 115 $g/m^2$, 23 $g/m^2$, and 10 $g/m^2$.

[EP Resin Sheet (1)]

A sheet made of the EP resin and having a basis weight of 100 $g/m^2$ was prepared.

[EP Resin Sheet (2)]

A sheet made of the EP resin and having a basis weight of 50 $g/m^2$ was prepared.

[EP Resin Sheet (3)]

A sheet made of the EP resin and having a basis weight of 53 $g/m^2$ was prepared.

(15) Process

For each of the drawing and impregnation steps, either one of the following was selected.

[Drawing Step (1)]

The woven fabric (1), which is used as a continuous reinforcing fiber sheet, is trimmed to a width of 20 mm and drawn with a warp direction of the woven fabric (1) as the direction of the fibers as the component [A] in the production method of the present invention.

[Drawing Step (2)]

A continuous reinforcing fiber sheet in which the component [A] is aligned in one direction in a sheet shape so that the fiber mass per unit area is 200 $g/m^2$ and the width is 20 mm is drawn with the fiber direction as the running direction.

[First Impregnating Step (1)]

The PA6 resin sheet (1) as the component [B] is disposed on the running continuous reinforcing fiber sheet. Thereafter, the PA6 resin sheet (1) is heated to a melting point or higher with an IR heater to be molten and attached to the entire surface of one surface of the continuous reinforcing fiber sheet, and further pressed with a nip roll whose surface temperature is set to 100° C. lower than the melting point of the component [B] to be impregnated and cooled, thereby obtaining a fiber-reinforced plastic intermediate.

[First Impregnating Step (2)]

While the continuous reinforcing fiber sheet is passed through a crosshead die and pulled, the component [B] molten by heating at a melting point 50° C. in a die is discharged from an extruder so that it has a basis weight of 40 $g/m^2$ and attached to the entire surface of one surface of the continuous reinforcing fiber sheet. The continuous reinforcing fiber sheet is further pressurized with a nip roll whose surface temperature is set to be 100° C. lower than the melting point of the component [B] to impregnate and cool the component [B], thereby obtaining a fiber-reinforced plastic intermediate.

[Second Impregnating Step (1)]

The EP resin sheet (1) is laminated on a surface of the fiber-reinforced plastic intermediate opposite to the surface impregnated with the resin sheet composed of the component [B], and a mold release film is disposed on the outermost layer to obtain a continuous laminate. While the continuous laminate is heated with an IR heater so that the viscosity of the EP resin as the component [C] is 1 Pa·s, the continuous laminate is pressurized with three pairs of nip rolls disposed in a straight line to impregnate the component [C] into the fiber-reinforced plastic intermediate, thereby obtaining a fiber-reinforced plastic substrate.

[Second Impregnating Step (2)]

The component [C] heated to a viscosity of 1 Pa·s is dropped onto a surface of the fiber-reinforced plastic intermediate opposite to the surface impregnated with the resin sheet composed of the component [B] so that it has a basis weight of 100 $g/m^2$ and the component [C] is attached to the fiber-reinforced plastic intermediate, and pressurized with three pairs of nip rolls to impregnate the component [C] into the fiber-reinforced plastic intermediate, thereby obtaining a fiber-reinforced plastic substrate.

[Curing Step]

The fiber-reinforced plastic substrate is introduced into a curing tank whose temperature is controlled to 130° C., and caused to run to cure the component [C].

[Take-Up Step]

The fiber-reinforced plastic substrate is wound with a drum winder.

(Reference Example 1): Prepreg for Evaluating Tensile Strength

The EP resin sheet (2) was superimposed on each of both surfaces of the continuous reinforcing fiber sheet drawn in the drawing step (2), and heat rolling was performed to Impregnate a thermosetting resin composition into reinforcing fibers (the same carbon fibers or glass fibers as those used in the Examples and Comparative Examples which will be described later) while heating and pressurizing, thereby obtaining a unidirectional prepreg.

(Reference Example 2): Laminate for Evaluating Tensile Strength

The unidirectional prepreg with a width of 20 mm prepared in Reference Example 1 was cut into a length of 200 mm in the fiber direction, and the cut pieces were aligned without any gap so as to achieve a width of 200 mm, and 4 plies were laminated so that the fiber directions were aligned in the same procedure. Next, fiber-reinforced plastic substrates with a width of 20 mm obtained in the Examples and Comparative Examples which will be described later were cut into a length of 200 mm, and the second surfaces thereof were aligned without any gap such that the fiber axial direction coincided with the fiber direction of the laminated prepreg to obtain a laminate. The obtained laminate was placed in a closed cross-section mold, and heated and pressurized at 160° C. and 0.6 MPa for 120 minutes to obtain a fiber reinforced composite material. The tensile strength of the obtained fiber reinforced material was evaluated as described above.

Example 1-1

A fiber-reinforced plastic substrate was produced by a roll-to-roll continuous production apparatus involving the drawing step (1), the first impregnating step (1), the second impregnating step (1), and the take-up step. Other materials, production conditions, characteristics obtained by the method shown in Reference Example 2, and the like are shown in Table 1.

Example 1-2

A fiber-reinforced plastic substrate was produced by the same process as in Example 1-1 except that the drawing step was changed from the drawing step (1) to the drawing step (2). The characteristics and the like obtained in Reference Example 2 are shown in Table 1.

Example 1-3

A fiber-reinforced plastic substrate was produced by the same process as in Example 1-2 except that the first impregnating step was changed from the first impregnating step (1) to the first impregnating step (2). The characteristics and the like obtained in Reference Example 2 are shown in Table 1.

Example 1-4

A fiber-reinforced plastic substrate was produced by the same process as in Example 1-3 except that the second impregnating step was changed from the second impregnating step (1) to the second impregnating step (2). The characteristics and the like obtained in Reference Example 2 are shown in Table 1.

Example 1-5

A fiber-reinforced plastic substrate was produced by the same process as in Example 1-4 except that a curing step was added between the second impregnating step and the take-up step. The characteristics and the like obtained in Reference Example 2 are shown in Table 1.

Example 1-6

The cooling conditions in the first impregnating step were adjusted to control the temperature of the fiber-reinforced plastic intermediate before being subjected to the second impregnating step. The temperature of the fiber-reinforced plastic intermediate at this time, when measured with a non-contact thermometer, was found to be 114° C. A fiber-reinforced plastic substrate was produced by the same process as in Example 1-5 except for the above-mentioned difference. The characteristics and the like obtained in Reference Example 2 are shown in Table 1.

(Example 1-7) to (Example 1-10)

Fiber-reinforced plastic substrates were produced using the respective materials and production conditions shown in Table 2 by the same process as in Example 1-6. The conditions which were not shown in the table were set similarly to Example 1-6. The characteristics and the like obtained in Reference Example 2 are shown in Table 2.

Comparative Example 1-1

The woven fabric (1) and the PA6 resin sheet (1) were both cut into a quadrangular shape having a length of 200 mm in the fiber direction and a width of 200 mm, and laminated to attain a structure of woven fabric (1)/woven fabric (1)/woven fabric (1)/woven fabric (1)/woven fabric (1)/PA6 resin sheet (1). The resulting laminate was sandwiched between flat plate molds, heated and pressurized at 240° C. and 0.6 MPa for 10 minutes, cooled, and then taken out to obtain a fiber reinforced composite material (A). The obtained fiber-reinforced composite material (A) was disposed in a closed cross-section mold having a resin injection port, and an EP resin preheated to 90° C. was injected into a surface opposite to the surface impregnated with the PA6 resin sheet (1) using a resin injection device, and held at 160° C. for 120 minutes to obtain a fiber-reinforced composite material (B). The characteristics of the obtained fiber-reinforced composite material (B) are shown in Table 2.

Comparative Example 1-2

The PA6 resin sheet (1), the reinforcing fiber mat (1) and the EP resin sheet (1) were laminated in this order, heated and pressurized at 240° C. using a double belt, and then cooled to obtain a substrate (A). On the other hand, the reinforcing fiber mat (1) and the EP resin sheet (1) were laminated in this order, and heated and pressurized at 130° C. with a double belt to obtain a substrate (B). The substrate (A) and the substrate (B) were cut into 200 mm×200 mm, and a laminate obtained by laminating the substrate (A)/the substrate (B)/the substrate (B)/the substrate (B) was sandwiched between flat plate molds so that the PA6 resin sheet (1) of the substrate (A) and the EP resin sheet (1) of the substrate (B) constituted outermost layers, and heated and pressed at 160° C., 1 MPa, 120 min to obtain a fiber reinforced composite material (C). The characteristics of the obtained fiber-reinforced composite material (C) are shown in Table 2.

Example 2-1

The fiber-reinforced plastic substrate with a width of 20 mm obtained in Example 1-6 was cut into a length of 160 mm with the fiber axial direction as the length direction, and 8 cut pieces were disposed in the width direction to form a 160 mm square. The pieces were sandwiched between molds, and warmed at 180° C. for 120 minutes under a pressure of 0.6 MPa using a press machine to obtain a fiber-reinforced resin flat plate having a length of 160 mm×a width of 160 mm. The obtained fiber-reinforced resin flat plate was inserted into an injection mold having a length of 160 mm×a width of 160 mm×a thickness of 1.5 mm, and the PA6 injection resin was injected as the injection resin so that the component [B] covering the first surface of the fiber-reinforced resin flat plate was welded to the injection resin to perform integral molding. The characteristics of the obtained integrated molding are shown in Table 3.

Comparative Example 2-1

An injection member having a length of 160 mm×a width of 160 mm×a thickness of 1.5 mm was obtained using the PA6 injection resin as the injection resin without inserting the fiber-reinforced resin flat plate in Example 2-1. The characteristics of the obtained injection molding are shown in Table 3.
<Study 1>

Comparison of Examples 1-1 to 1-10 and Comparative Examples 1-1 to 1-2 showed that a fiber-reinforced plastic substrate containing a thermoplastic resin and a thermosetting resin, which could generally be produced only in batch production or had problems such as resin decomposition and insufficient strength, could be produced at low cost and high strength according to the present invention. In Example 1-1, it was shown that the production method of the present invention could be applied even when the thermoplastic resin was a film (sheet). Further, in Example 1-2, it was shown that not only the production speed could be increased but also the specific strength of the obtained fiber-reinforced plastic substrate was improved by making the reinforcing fibers unidirectional. In Example 1-3, it was shown that productivity could be improved by melting and directly applying the pellets to the continuous reinforcing fiber sheet without forming the thermoplastic resin into a sheet shape such as a film or a nonwoven fabric. In Example 1-4, it was shown that productivity could be improved by melting and directly applying the thermosetting resin without forming the thermosetting resin into a sheet shape. In Example 1-5, a substrate excellent in handleability could be obtained by adding a curing step. In Example 1-6, by controlling the temperature of the fiber-reinforced plastic intermediate after the first impregnating step, the second impregnating step could be performed more efficiently, and the productivity was improved. In Examples 1-7 to 9, it was shown that the production method of the present invention could be applied regardless of the type of the component [B]. In Example 1-10, it was shown that the production method of the present invention was effective even when the component [A] was changed from carbon fiber to glass fiber.

According to Example 2-1 presenting the integrated molding using the fiber-reinforced plastic substrate of Example 1-6, it is shown that the ability of the fiber-reinforced plastic substrate obtained according to the present invention as a reinforcing material is high, and that the integrated molding weld joined to another molding member exhibits very high mechanical characteristics as compared with the case where no reinforcement was performed described in Comparative Example 2-1.

Example 3-1

The carbon fiber (1) was used as the component [A], the EP resin was used as the component [C], and the PA-based resin nonwoven fabric (1) was used as the component [B]. These materials were continuously subjected to the following steps (I) to (IV) to obtain a fiber-reinforced plastic substrate. The materials used in the method for producing a fiber-reinforced plastic substrate, various conditions, and evaluation results are summarized in Table 4.

Drawing step: Twenty (20) components [A] were caused to run while being aligned in one direction, and drawn as a continuous reinforcing fiber sheet.

First impregnating step: An epoxy resin as the component [C], which was heated to 70° C., was applied to the first surface of the running continuous reinforcing fiber sheet (fiber-reinforced group) using a spray-type resin application device (first impregnating step (I)), and the sheet was passed through a stationary roller heated to 70° C. to impregnate the component [C] into the continuous reinforcing fiber sheet by rubbing (first impregnating step (I1)), thereby obtaining a fiber-reinforced plastic intermediate.

Second impregnating step: The PA-based resin nonwoven fabric (1) as the component [B] was disposed on both surfaces of the fiber-reinforced plastic intermediate without stopping the line from the first impregnating step so as to protrude from both ends of the fiber-reinforced plastic intermediate by 5 mm each (second impregnating step (I)), and the component [B] on the surface was pressure-bonded by pressurization at a pressure of 100 N/m with a nip roller heated to 140° C. (second impregnating step (II)) to obtain a fiber-reinforced plastic substrate having a width of 100 mm.

Example 3-2

A fiber-reinforced plastic substrate was obtained in the same manner as in Example 3-1 except that: the application mechanism, resin viscosity, applied area ratio, and heating temperature in the first impregnating step, and the thickness ratio of the component [B], pressurization force, and heating temperature in the second impregnating step were changed. The evaluation results of the fiber-reinforced plastic substrate are summarized in Table 4.

Example 3-3

A fiber-reinforced plastic substrate was obtained in the same manner as in Example 3-1 except that: the resin viscosity, applied area ratio, and heating temperature in the first impregnating step, and the thickness ratio of the component [B], pressurization force, and heating temperature in the second impregnating step were changed. The evaluation results of the fiber-reinforced plastic substrate are summarized in Table 4.

Example 3-4

A fiber-reinforced plastic substrate was obtained in the same manner as in Example 3-1 except that: the PA6 resin (2) was used as the component [B]; and the application mechanism, resin viscosity, applied area ratio, pressurization mechanism, pressurization force, and heating temperature in the first impregnating step, and the thickness ratio of the component [B], pressurization force, and heating temperature in the second impregnating step were changed.

The evaluation results of the fiber-reinforced plastic substrate are summarized in Table 4.

Example 3-5

A fiber-reinforced plastic substrate was obtained in the same manner as in Example 3-1 except that: the PEs resin sheet (1) was used as the component [B]; and the application mechanism, resin viscosity, applied area ratio, pressurization mechanism, pressurization force and heating temperature in the first impregnating step, and the thickness ratio of the component [B], pressurization force, and heating temperature in the second impregnating step were changed.

The evaluation results of the fiber-reinforced plastic substrate are summarized in Table 4.

Example 3-6

A fiber-reinforced plastic substrate was obtained in the same manner as in Example 3-1 except that: the PPS resin nonwoven fabric (1) was used as the component [B]; and the application mechanism, resin viscosity, applied area ratio, pressurization mechanism, pressurization force and heating temperature in the first impregnating step, and the thickness ratio of the component [B], end covering width of the component [B], pressurization mechanism, and pressurization force in the second impregnating step were changed. The evaluation results of the fiber-reinforced plastic substrate are summarized in Table 4.

Example 3-7

A fiber-reinforced plastic substrate was obtained in the same manner as in Example 3-1 except that: the PPS resin nonwoven fabric (1) was used as the component [B]; and the application mechanism, resin viscosity, applied area ratio, pressurization force, and heating temperature in the first impregnating step, and the thickness ratio of the component [B], end covering width of the component [B], pressurization mechanism, and pressurization force in the second impregnating step were changed. The evaluation results of the fiber-reinforced plastic substrate are summarized in Table 4.

Comparative Example 3-1

A fiber-reinforced plastic substrate was obtained in the same manner as in Example 3-1 except that: the PP resin sheet (1) was used as the component [B]; the application mechanism, applied area ratio, pressurization mechanism, pressurization force and heating temperature in the first impregnating step, and the thickness ratio of the component [B], end covering width of the component [B], pressurization mechanism, and pressurization force in the second impregnating step were changed; and the steps were performed intermittently. The evaluation results of the fiber-reinforced plastic substrate are summarized in Table 5.

Comparative Example 3-2

The PP resin sheet (1) was used as the component [B]; the application mechanism, applied area ratio, pressurization mechanism, pressurization force, and heating temperature in the first impregnating step, and the thickness ratio of the component [B] and end covering width of the component [B] in the second impregnating step were changed; and after the second impregnating step (I), the fiber-reinforced plastic substrate was once wound, and then the second impregnating step (II) was performed. The pressurization mechanism, the pressurizing force, and the heating temperature at that time were changed from those in Example 3-1.

A fiber-reinforced plastic substrate was obtained under the same other conditions as in Example 3-1. The evaluation results of the fiber-reinforced plastic substrate are summarized in Table 5.

Comparative Example 3-3

The component [B] was not used; the application mechanism and the applied area ratio in the first impregnating step were changed; and the apparatus was stopped once after the first impregnating step (I), and then the first impregnating step (II) was performed. The pressurization mechanism, the pressurizing force, and the heating temperature at that time were changed from those in Example 3-1.

Furthermore, the second impregnating step was not performed.

A fiber-reinforced plastic substrate was obtained in the same manner as in Example 3-1 except for these points. The evaluation results of the fiber-reinforced plastic substrate are summarized in Table 5.

Comparative Example 3-4

The application mechanism, resin viscosity, pressurization mechanism, pressurization force, heating temperature in the first impregnating step, and the thickness ratio of component [B] and end covering width of component [B] in second impregnating step were changed; and after completion of the second impregnating step (I), the fiber-reinforced plastic substrate was once wound. Thereafter, the second impregnating step (II) was performed, and pressurization mechanism, pressurization force, and heating temperature at that time were changed from those in Example 3-1.

A fiber-reinforced plastic substrate was obtained in the same manner as in Example 3-1 except for these points. The evaluation results of the fiber-reinforced plastic substrate are summarized in Table 5.

Comparative Example 3-5

The PA-based resin nonwoven fabric having a large through-hole area was used as the component [B]; the application mechanism, applied area ratio, pressurization mechanism, pressurization force, and heating temperature in the first impregnating step, and the thickness ratio of the component [B] and end coating width of the component [B] in the second impregnating step were changed; and after completion of the second impregnating step (I), the fiber-reinforced plastic substrate was once wound. Thereafter, the second impregnating step (II) was performed, and the pressurization mechanism at that time was changed from that used in Example 3-1.

A fiber-reinforced plastic substrate was obtained in the same manner as in Example 3-1 except for these points. The evaluation results of the fiber-reinforced plastic substrate are summarized in Table 5.

TABLE 1-1

|  |  | Example 1-1 | Example 1-2 | Example 1-3 | Example 1-4 | Example 1-5 | Example 1-6 |
|---|---|---|---|---|---|---|---|
| Component [A] | — | Carbon fiber (1) | Carbon fiber (1) | Carbon fiber (1) | Carbon fiber (1) | Carbon fiber (1) | Carbon fiber (1) |
| Component [B] | — | PA6 resin (1) | PA6 resin (1) | PA6 resin (1) | PA6 resin (1) | PA6 resin (1) | PA6 resin (1) |
| Component [C] | — | EP resin | EP resin | EP resin | EP resin | EP resin | EP resin |
| Take-up speed | [m/min] | 1 | 5 | 5 | 10 | 5 | 5 |
| Impregnation rate | [%] | 96.4 | 95.8 | 95.3 | 95.7 | 95.9 | 96.9 |
| Amount of component [A] in component [C] | [%] | 89.0 | 90.5 | 91.5 | 91.0 | 91.3 | 91.6 |
| Degree of cure | [%] | 33 | 31 | 31 | 24 | 65 | 69 |
| Temperature of fiber-reinforced plastic intermediate immediately after first impregnating step | [° C.] | 62 | 65 | 82 | 85 | 79 | 114 |

TABLE 1-1-continued

|  |  | Example 1-1 | Example 1-2 | Example 1-3 | Example 1-4 | Example 1-5 | Example 1-6 |
|---|---|---|---|---|---|---|---|
| Roughness average length RSm | [μm] | 57 | 47 | 45 | 32 | 36 | 35 |
| Roughness average height Rc | [μm] | 18 | 23 | 21 | 25 | 24 | 22 |
| Productivity | — | C | B | A | A | A | A |
| Tensile strength | [MPa] | 623 | 1710 | 1755 | 1742 | 1701 | 1790 |
| Density | [g/cm$^3$] | 1.48 | 1.48 | 1.48 | 1.48 | 1.48 | 1.48 |
| Specific strength | [MPa/(g/cm$^3$)] | 421 | 1155 | 1186 | 1177 | 1149 | 1209 |

TABLE 2

|  |  | Example 1-6 | Example 1-7 | Example 1-8 | Example 1-9 | Example 1-10 | Comparative Example 1-1 | Comparative Example 1-2 |
|---|---|---|---|---|---|---|---|---|
| Component [A] | — | Carbon fiber (1) | Carbon fiber (1) | Carbon fiber (1) | Carbon fiber (1) | Glass fiber (1) | Carbon fiber (2) | Carbon fiber (1) |
| Component [B] | — | PA6 resin (1) | PEEK resin | PP resin (1) | PC resin | PA6 resin (1) | PA6 resin (1) | PA6 resin (1) |
| Component [C] | — | EP resin | EP resin | EP resin | EP resin | EP resin | EP resin | EP resin |
| Take-up speed | [m/min] | 5 | 4 | 4 | 5 | 5 | — | 1 |
| Impregnation rate | [%] | 96.9 | 96.1 | 96.4 | 97.6 | 96.5 | 96.3 | 83.5 |
| Amount of component [A] in component [C] | [%] | 91.6 | 93.5 | 92.0 | 91.0 | 90.4 | 86.0 | 70.0 |
| Degree of cure | [%] | 69 | 72 | 71 | 72 | 66 | 95 | 40 |
| Temperature of fiber-reinforced plastic intermediate immediately after first impregnating step | [° C.] | 114 | 121 | 101 | 104 | 107 | 25 | — |
| Roughness average length RSm | [μm] | 35 | 42 | 38 | 49 | 89 | 52 | 78 |
| Roughness average height Rc | [μm] | 22 | 16 | 12 | 21 | 11 | 16 | 13 |
| Productivity | — | A | B | A | A | C | D | C |
| Tensile strength | [MPa] | 1790 | 1850 | 1690 | 1708 | 1000 | 615 | 280 |
| Density | [g/cm$^3$] | 1.48 | 1.48 | 1.48 | 1.48 | 1.73 | 1.53 | 1.23 |
| Specific strength | [Mpa/(g/cm$^3$)] | 1209 | 1250 | 1142 | 1154 | 578 | 402 | 228 |

TABLE 3

|  |  | Example 2-1 | Comparative Example 2-1 |
|---|---|---|---|
| Fiber-reinforced plastic substrate | — | One in Example 1-6 | None |
| Flexural modulus | GPa | 17.8 | 10.9 |
| Flexural strength | MPa | 519.8 | 256.0 |

TABLE 4

|  |  | Unit | Example 3-1 | Example 3-2 | Example 3-3 | Example 3-4 |
|---|---|---|---|---|---|---|
| Component [A] | Type | — | Carbon fiber (1) | Carbon fiber (1) | Carbon fiber (1) | Carbon fiber (1) |
|  | Basis weight | g/m$^2$ | 160 | 160 | 160 | 160 |
| Component [B] | Type | — | PA-based resin | PA-based resin | PA-based resin | PA6 resin (2) |
|  | Basis weight | g/m$^2$ | 115 | 10 | 23 | 23 |
|  | Form | — | Nonwoven fabric | Nonwoven fabric | Nonwoven fabric | Molten |
|  | Through hole | % | 0 | 0 | 0 | 0 |
| Component [C] | Type | — | Epoxy resin | Epoxy resin | Epoxy resin | Epoxy resin |
|  | Basis weight | g/m$^2$ | 106 | 106 | 106 | 106 |

TABLE 4-continued

|  |  |  | Unit |  |  |  |  |
|---|---|---|---|---|---|---|---|
| First impregnating step | Step (I) | Mechanism | Type | Spray | Applicator | Spray | Dip |
|  |  | Resin viscosity | Pa·s | 1 | 0.1 | 120 | 0.1 |
|  |  | Applied area ratio | % | 120 | 75 | 130 | 100 |
|  | Step (II) | Mechanism | Type | Friction | Friction | Friction | Tension application |
|  |  | Pressurization force | kN | 3 | 3 | 3 | 1 |
|  |  | Heating temperature | ° C. | 70 | 100 | 100 | 100 |
| Second impregnating step | Step (I) | Thickness ratio of component [B] | % | 56 | 10 | 20 | 20 |
|  |  | End covering width of component [B] | mm | 5 | 5 | 5 | 5 |
|  | Step (II) | Mechanism | Type | Nip | Nip | Nip | Nip |
|  |  | Pressurization force | kN | 3 | 1 | 1 | 1 |
|  |  | Heating temperature | ° C. | 160 | 140 | 140 | 140 |
| Entire production method | Continuous operation |  | Intermittence/Continuous | Continuous | Continuous | Continuous | Continuous |
|  | Line speed |  | m/min | 50 | 30 | 30 | 30 |
| fiber-reinforced plastic substrate | Peeling force |  | N/10 mm | 5 | 3 | 5 | 5 |
|  | Handleability |  | — | A | A | A | A |

|  |  |  | Unit | Example 3-5 | Example 3-6 | Example 3-7 |
|---|---|---|---|---|---|---|
| Component [A] |  | Type | — | Carbon fiber (1) | Carbon fiber (1) | Carbon fiber (1) |
|  |  | Basis weight | g/m² | 160 | 160 | 160 |
| Component [B] |  | Type | — | PEs resin | PPS resin | PPS resin |
|  |  | Basis weight | g/m² | 50 | 23 | 23 |
|  |  | Form | — | Film | Nonwoven fabric | Nonwoven fabric |
|  |  | Through hole | % | 0 | 10 | 10 |
| Component [C] |  | Type | — | Epoxy resin | Epoxy resin | Epoxy resin |
|  |  | Basis weight | g/m² | 106 | 106 | 106 |
| First impregnating step | Step (I) | Mechanism | Type | Dip | Applicator | Applicator |
|  |  | Resin viscosity | Pa·s | 0.1 | 10 | 0.1 |
|  |  | Applied area ratio | % | 100 | 80 | 100 |
|  | Step (II) | Mechanism | Type | Tension application | Nip | Friction |
|  |  | Pressurization force | kN | 1 | 2 | 6 |
|  |  | Heating temperature | ° C. | 100 | 80 | 80 |
| Second impregnating step | Step (I) | Thickness ratio of component [B] | % | 22 | 20 | 20 |
|  |  | End covering width of component [B] | mm | 5 | 0 | 0 |
|  | Step (II) | Mechanism | Type | Nip | Press | Tension application |
|  |  | Pressurization force | kN | 1 | 6 | 1 |
|  |  | Heating temperature | ° C. | 140 | 160 | 160 |
| Entire production method | Continuous operation |  | Intermittence/Continuous | Continuous | Continuous | Continuous |
|  | Line speed |  | m/min | 30 | 10 | 30 |
| fiber-reinforced plastic substrate | Peeling force |  | N/10 mm | 4 | 6 | 1 |
|  | Handleability |  | — | A | B Poor productivity | A |

TABLE 5

|  |  |  | Unit | Comparative Example 3-1 | Comparative Example 3-2 | Comparative Example 3-3 |
|---|---|---|---|---|---|---|
| Component [A] |  | Type | — | Carbon fiber (1) | Carbon fiber (1) | Carbon fiber (1) |
|  |  | Basis weight | g/m² | 160 | 160 | 160 |
| Component [B] |  | Type | — | PP resin (2) | PP resin (2) | No |
|  |  | Basis weight | g/m² | 136 | 136 | — |
|  |  | Form | — | Film | Film | — |
|  |  | Through hole | % | 0 | 0 | — |
| Component [C] |  | Type | — | Epoxy resin | Epoxy resin | Epoxy resin |
|  |  | Basis weight | g/m² | 106 | 106 | 106 |
| First impregnating step | Step (I) | Mechanism | Type | Film transfer | Film transfer | Film transfer |
|  |  | Resin viscosity | Pa·s | 1 | 1 | 1 |
|  |  | Applied area ratio | % | 100 | 100 | 100 |

TABLE 5-continued

|  |  |  | Unit | | | |
|---|---|---|---|---|---|---|
| | Step (II) | Mechanism | Type | Nip | Nip | Nip |
| | | Pressurization force | kN | 6 | 6 | 6 |
| | | Heating temperature | ° C. | 80 | 80 | 80 |
| Second impregnating step | Step (I) | Thickness ratio of component [B] | % | 60 | 60 | 60 |
| | | End covering width of component [B] | mm | 0 | 0 | 0 |
| | Step (II) | Mechanism | Type | Press | Press | No |
| | | Pressurization force | kN | 6 | 6 | — |
| | | Heating temperature | ° C. | 160 | 250 | — |
| Entire production method | | Continuous operation | Intermittence/Continuous | Intermittent | Intermittent | Intermittent |
| | | Line speed | m/min | 30 | 30 | Impossible |
| fiber-reinforced plastic substrate | | Peeling force | N/10 mm | 0.8 | Unmeasurable | Unmeasurable |
| | | Handleability | — | C Poor productivity and variation | C Poor productivity and fluff | C All poor |

|  |  |  | Unit | Comparative Example 3-4 | Comparative Example 3-5 |
|---|---|---|---|---|---|
| Component [A] | | Type | — | Carbon fiber (1) | Carbon fiber (1) |
| | | Basis weight | g/m² | 160 | 160 |
| Component [B] | | Type | — | PA-based resin | PA-based resin |
| | | Basis weight | g/m² | 136 | 136 |
| | | Form | — | Nonwoven fabric | Nonwoven fabric |
| | | Through hole | % | 0 | 30 |
| | | Type | — | Epoxy resin | Epoxy resin |
| | | Basis weight | g/m² | 106 | 106 |
| First impregnating step | Step (I) | Mechanism | Type | Film transfer | Film transfer |
| | | Resin viscosity | Pa · s | 1 | 1 |
| | | Applied area ratio | % | 100 | 100 |
| | Step (II) | Mechanism | Type | Press | Press |
| | | Pressurization force | kN | 6 | 6 |
| | | Heating temperature | ° C. | 80 | 80 |
| Second impregnating step | Step (I) | Thickness ratio of component [B] | % | 60 | 60 |
| | | End covering width of component [B] | mm | −3 | 5 |
| | Step (II) | Mechanism | Type | Press | Press |
| | | Pressurization force | kN | 6 | 3 |
| | | Heating temperature | ° C. | 60 | 160 |
| Entire production method | | Continuous operation | Intermittence/Continuous | Intermittent | Intermittent |
| | | Line speed | m/min | Impossible | Impossible |
| fiber-reinforced plastic substrate | | Peeling force | N/10 mm | Unmeasurable | 0.8 |
| | | Handleability | — | C All poor | C Poor productivity and stickiness |

INDUSTRIAL APPLICABILITY

According to the production method of the present invention, it is possible to provide a fiber-reinforced plastic substrate having a thermoplastic resin welding layer and having high mechanical characteristics. Furthermore, it is possible to suppress the production from being stopped due to fluffing of the reinforcing fibers or the like, which is observed during the production of the conventional fiber-reinforced plastic substrate, and to produce the fiber-reinforced plastic substrate with a device having a simple mechanism. In addition, since it is possible to obtain a fiber-reinforced plastic substrate excellent in handleability, it is possible to greatly reduce the overall cost as a structure by applying the fiber-reinforced plastic substrate to aircraft structural members, wind blades, automobile structural members, and computer applications such as IC trays and housings of notebook computers.

DESCRIPTION OF REFERENCE SIGNS

α: Cross section of continuous reinforcing fiber sheet
β: Cross section of fiber-reinforced plastic intermediate
γ: Cross section of fiber-reinforced plastic substrate
1: Fiber-reinforced plastic substrate
2: Component [A]
3: Component [B] and component [C]
4: Axial direction of arbitrary fiber bundle
5: Observed cross section
6: Component [A]
7: Resin area mainly composed of component [B]
8: Resin area mainly composed of component [C]
9: Observation image
10: Boundary
11: Reference line
12: Vertical base line
13: Cross-section curve 14: Component [A]
15: Either of component [B] or component [C]
16: The other of component [B] or component [C]
17: Continuous reinforcing fiber sheet
18: Fiber-reinforced plastic intermediate
19: Fiber-reinforced plastic substrate
20: First surface
21: Second surface
22: Drawing step
23: First impregnating step
24: Second impregnating step
25: Curing step
26: Take-up step

The invention claimed is:

1. A method for producing a fiber-reinforced plastic substrate containing the following components [A], [B], and [C]:
[A] a reinforcing fiber;
[B] a thermoplastic resin; and
[C] a thermosetting resin,
wherein at least the following drawing step, first impregnating step, second impregnating step, and take-up step are continuously and sequentially performed while the component [A] is caused to run:
the drawing step being a step of drawing a continuous reinforcing fiber sheet comprising the component [A],
the first impregnating step being a step of impregnating either the component [B] or the component [C] from one surface of the continuous reinforcing fiber sheet to obtain a fiber-reinforced plastic intermediate in which either the component [B] or the component [C] is disposed on a first surface,
the second impregnating step being a step of impregnating the other of the component [B] or the component [C] from a second surface opposite to the first surface to obtain a fiber-reinforced plastic substrate, and
the take-up step being a step of taking up the fiber-reinforced plastic substrate, and
wherein the fiber-reinforced plastic substrate has a degree of cure of the component [C] obtained by DSC of 50% or less.

2. The method for producing a fiber-reinforced plastic substrate according to claim 1, wherein, when the component [C] is impregnated into the continuous reinforcing fiber sheet or the fiber-reinforced plastic intermediate, component [C] having a viscosity of less than 5 Pa·s is impregnated by dipping or coating.

3. The method for producing a fiber-reinforced plastic substrate according to claim 1, wherein, when the component [C] is impregnated into the continuous reinforcing fiber sheet or the fiber-reinforced plastic intermediate, the component [C] is applied such that, in the obtained fiber-reinforced plastic intermediate or fiber-reinforced plastic substrate, a projected area of the component [C], when projected in a running direction thereof, is within a range of 80 to 120% with respect to a projected area of the component [A].

4. The method for producing a fiber-reinforced plastic substrate according to claim 1, wherein the component [C] is impregnated into the continuous reinforcing fiber sheet or the fiber-reinforced plastic intermediate by pressurization using a roll or a belt.

5. The method for producing a fiber-reinforced plastic substrate according to claim 1, wherein the continuous reinforcing fiber sheet is a unidirectional reinforcing fiber bundle.

6. The method for producing a fiber-reinforced plastic substrate according to claim 1, wherein, when the component [B] is impregnated into the continuous reinforcing fiber sheet or the fiber-reinforced plastic intermediate, an area of a region where the component [B] is absent is set to be in a range of 0 to 20%, based on 100% of an area of the continuous reinforcing fiber sheet or the fiber-reinforced plastic intermediate when projected in a thickness direction thereof.

7. The method for producing a fiber-reinforced plastic substrate according to claim 1, wherein, in the fiber-reinforced plastic substrate, adhesive strength between a resin area comprising the component [B] and a resin area comprising the component [C] is 1 N/10 mm or more.

8. The method for producing a fiber-reinforced plastic substrate according to claim 1, wherein a take-up speed in the take-up step is 0.1 m/min or more.

9. The method for producing a fiber-reinforced plastic substrate according to claim 1, wherein, when the component [B] is impregnated into the continuous reinforcing fiber sheet or the fiber-reinforced plastic intermediate, the component [B] is applied in a molten state, impregnated, and subsequently cooled.

10. The method for producing a fiber-reinforced plastic substrate according to claim 1, wherein, when the component [B] is impregnated into the continuous reinforcing fiber sheet or the fiber-reinforced plastic intermediate, the component [B] is disposed in a sheet shape, subsequently heated to be in a molten state, impregnated into the continuous reinforcing fiber sheet or the fiber-reinforced plastic intermediate, and then cooled.

11. The method for producing a fiber-reinforced plastic substrate according to claim 1, wherein the fiber-reinforced plastic intermediate obtained in the first impregnating step has a temperature of 70 to 180° C.

* * * * *